US012694641B2

(12) United States Patent
Utsumi

(10) Patent No.: US 12,694,641 B2
(45) Date of Patent: Jul. 28, 2026

(54) ANALYSIS SYSTEM AND PRODUCTION METHOD OF ANALYSIS IMAGE

(71) Applicant: ReMI Corporation, Shizuoka (JP)

(72) Inventor: Hideo Utsumi, Shizuoka (JP)

(73) Assignee: ReMI Corporation, Shizuoka (JP)

( * ) Notice: Subject to any disclaimer, the term of this patent is extended or adjusted under 35 U.S.C. 154(b) by 373 days.

(21) Appl. No.: 18/010,387

(22) PCT Filed: Jun. 23, 2022

(86) PCT No.: PCT/JP2022/025081
§ 371 (c)(1),
(2) Date: Dec. 14, 2022

(87) PCT Pub. No.: WO2023/062882
PCT Pub. Date: Apr. 20, 2023

(65) Prior Publication Data
US 2024/0290067 A1 Aug. 29, 2024

(30) Foreign Application Priority Data
Oct. 12, 2021 (JP) ................................. 2021-167393

(51) Int. Cl.
*G06V 10/60* (2022.01)
*A61B 5/055* (2006.01)
(Continued)

(52) U.S. Cl.
CPC .................................... *G06V 10/60* (2022.01)

(58) Field of Classification Search
USPC ........................................................ 382/190
See application file for complete search history.

(56) References Cited

U.S. PATENT DOCUMENTS 4,891,593 A 1/1990 Lurie et al.
10,835,199 B2 * 11/2020 Chtcheprov ......... A61B 5/0037
(Continued)

FOREIGN PATENT DOCUMENTS

CN 105072991 A 11/2015
CN 106415298 A 2/2017
(Continued)

OTHER PUBLICATIONS

International Search Report issued in PCT/JP2022/025081 mailed on Sep. 13, 2022 with English Translation (4 pages).
(Continued)

*Primary Examiner* — Chineyere Wills-Burns
*Assistant Examiner* — Aaron Timothy Bonansinga
(74) *Attorney, Agent, or Firm* — Nakanishi IP Associates, LLC

(57) ABSTRACT

An analysis system in which an image component part is provided, and the image component part includes a memory part and an image operation part, the memory part stores at least core image pixel information and operating image pixel information, the core image pixel information and the operating image pixel information include the same sample and the same analysis target region and include a predetermined number of pixels imaged by different imaging systems, the operating image pixel information includes analysis information and is image pixel information with luminance and/or resolution lower than the core image pixel information, and the image operation part performs operations including Hadamard product for at least one or more pieces of the core image pixel information and at least one or more pieces of the operating image pixel information so as to build a new created image pixel information.

8 Claims, 17 Drawing Sheets

(51) Int. Cl.

| | | |
|---|---|---|
| *G01R 33/28* | (2006.01) | |
| *G01R 33/44* | (2006.01) | |
| *G01R 33/48* | (2006.01) | |
| *G01R 33/56* | (2006.01) | |
| *G01R 33/60* | (2006.01) | |
| *G06T 5/50* | (2006.01) | |

(56) References Cited

U.S. PATENT DOCUMENTS

| | | | | |
|---|---|---|---|---|
| 2012/0293171 | A1 | 11/2012 | Dannels et al. | |
| 2013/0012805 | A1* | 1/2013 | Penn | A61B 5/055 |
| | | | | 600/411 |
| 2016/0018501 | A1 | 1/2016 | Kimura | |
| 2017/0103529 | A1* | 4/2017 | Shi | G06T 12/10 |
| 2017/0160365 | A1 | 6/2017 | Helle et al. | |
| 2017/0234952 | A1* | 8/2017 | Zhang | G01R 33/56308 |
| | | | | 324/309 |
| 2018/0005415 | A1* | 1/2018 | Wang | G06T 12/10 |
| 2018/0095153 | A1* | 4/2018 | Kimura | G01R 33/56333 |
| 2018/0153502 | A1* | 6/2018 | Duric | A61B 8/0825 |
| 2018/0260649 | A1* | 9/2018 | Kadambe | H04N 5/919 |
| 2020/0357153 | A1* | 11/2020 | Zhao | B06T 12/20 |
| 2022/0301112 | A1* | 9/2022 | DeLaRosa | G06T 5/50 |

FOREIGN PATENT DOCUMENTS

| | | | | |
|---|---|---|---|---|
| JP | 2010-046103 | A | 3/2010 | |
| WO | 92/04640 | A1 | 3/1992 | |
| WO | 94/03824 | A1 | 2/1994 | |
| WO | WO-2015152957 | A1 * | 10/2015 | ......... G01R 33/5608 |

OTHER PUBLICATIONS

Written Opinion of the International Searching Authority issued in PCT/JP2022/025081 mailed on Sep. 13, 2022 with English Translation (8 pages).

W. Youngdee et al, Optimization of field-cycled PEDRI for in vivo imaging of free radicals, Phys, Med. Biol. 46 (2001) 2531-2544 (14 pages).

D. Lurei et al. Field-cycled PEDRI imaging of free radicals with detection at 450mT, Magn. Reson. Imaging 23,175-181 (2005) (7 pages).

George P.H. Styan, Hadamard Products and Multivariate Statistical Analysis, Linear Algebra and Its Application 6: 217-240 (1973) (24 pages).

Deshmukh, Manjusha, et al., Image Fusion and Image Quality Assessment of Fused Images, International Journal of Image processing, 2010, vol. 4, Issue—5, pp. 484-508 2. Fusion Algorithms-3. Fused Image Evaluation (25 pages).

Volker, Christoph, et al., Multi sensor data fusion approach for automatic honeycomb detection in concrete, NDT & E International, 2015, vol. 71, pp. 54-60 1 Introduction-4 Evaluation of Fusion Results (22 pages).

Notice of Reasons for Rejection dated Mar. 7, 2023 issued in Japanese Patent Application No. 2022-579777 with English Translation (9 pages).

Extended European Search Report issued in European Patent Application No. 22817518.8, dated on May 27, 2024 (12 pages).

Katherine Rose Fisher, Devising New Biomedical Imaging Applications for Metallodrugs based on an Improved Understanding of their Electronic and Magnetic Properties, PHD Thesis—Linacre College—University of Oxford, Oct. 1, 2020 (176 pages)—English: K R Fisher—Devising New Biomedical Imaging Applications.pdf.

"MRIQUESTIONS.com" published by Allen D. Elster, MD FACR (2015), on the website at https://www.mriquestions.com/index.html (2 pages).

"DWI b-Value" in "Question and Answres in MRI" published by Allen D. Elster, MD FACR (2015), on the website at https://www.mriquestions.com/what-is-the-b-value.html (2 pages).

"Spin Diffusion Measurements: Spin Echoes in the Presence of a Time-Dependent Field Gradient" (J. Chem. Phys. 42, 288 (1965); doi: 10.1063/1.1695690), published Jan. 1, 1965, Authers: E. 0. Stejskal and J. E. Tanner (6 pages).

Office Action issued in Chinese Patent Application No. 202280005417.X dated Feb. 15, 2026, with English Translation (10 pages).

Communication pursuant to Article 94(3) issued in European Patent Application No. 22817518.8, dated on Apr. 20, 2026, with English Translation (7 pages).

* cited by examiner

| Cmp. conc. | Conventional method | | This work | | Experiment 1 | |
|---|---|---|---|---|---|---|
| | $T_1$ weighted image | PD image | $T_1$ created image | | Increase | |
| | $T_1$ operating image | PD core image | | | | |
| | $CI_{op-T1}$ | $CI_{core-PD}$ | $CI_{op-T1} \bigcirc CI_{core-PD} = CI_{created-T1}$ | | | |
| | SI | SNR | SI | SNR | SI | SNR | SI | SNR |
| 8mM | 664 | 10 | 1641 | 27 | 1325984 | 189 | 1996 | 18 |
| 4mM | 429 | 7 | 1570 | 26 | 925423 | 132 | 2160 | 20 |
| 2mM | 325 | 5 | 1545 | 26 | 702508 | 100 | 2160 | 20 |
| water | 243 | 4 | 1369 | 23 | 474978 | 88 | 1951 | 18 |

Cmp.3-carbamoyl-PEOXYL
conc.: concentration

Fig. 2C

| | Conventional $CI_{DNP}$ | | Experiment 2 $CI_{created-DNP}$ $CI_{ap-DNP} \circ CI_{core-PD}$ | | | | Experiment 3 $CI_{created-DNP-T1}$ $\left( CI_{ap-DNP} \circ CI_{core-PD} \right) \circ CI_{ap-T1}$ | | | | |
|---|---|---|---|---|---|---|---|---|---|---|---|
| | DNP image Conventional method (DNP) | | This work | | Increase | | This work | | Increase | | |
| Cmp conc. | SI | SNR | SI | SNR | SI | SNR | SI | SNR | SI | SNR | |
| 8mM | 263 | 3 | 468385 | 65 | 1785 | 22 | 391598840 | 498 | 1489360 | 166 | |
| 4mM | 270 | 3 | 493143 | 68 | 1828 | 22 | 297307342 | 378 | 1102302 | 124 | |
| 2mM | 221 | 2 | 391495 | 54 | 1770 | 22 | 183797077 | 234 | 830999 | 94 | |
| water | 8 | 0 | 10267 | 1 | 1650 | 20 | 7493218 | 10 | 1204438 | 130 | |

Cmp:3-carbamoyl-PROXYL
conc.: concentration

Fig. 2F

| | Control | Experiment 4 | | | | Experiment 5 | | | |
|---|---|---|---|---|---|---|---|---|---|
| | DNP image 128×128 $CI_{DNP}$ | 128×128 $CI_{op-DNP}$ ○ 128×128 $CI_{core-PD}$ | | | | 16×16 ⇨ 128×128 $CI_{op-DNP}$ ○ 128×128 $CI_{core-PD}$ | | | |
| | Coventional | This work | | Increase | | This work (matrix change) | | increase | |
| sample | SI | SNR | SI | SNR | SI | SNR | SI | SNR | SI | SNR |
| Cmp 2mM | 764.28 | 4.8839 | 7589150 | 192.2 | 9930 | 39 | 2344518 | 290.9 | 3068 | 60 |
| water | 68.349 | 0.4368 | 339284 | 8.6 | 4964 | 20 | 19263 | 2.4 | 282 | 6 |
| glove(PVA) | 54.222 | 0.3465 | 222968 | 5.6 | 4112 | 16 | 495003 | 61.4 | 9129 | 177 |

Fig. 3C

Cmp:3-carbamoyl-PROXYL (a)

Figure 4B:
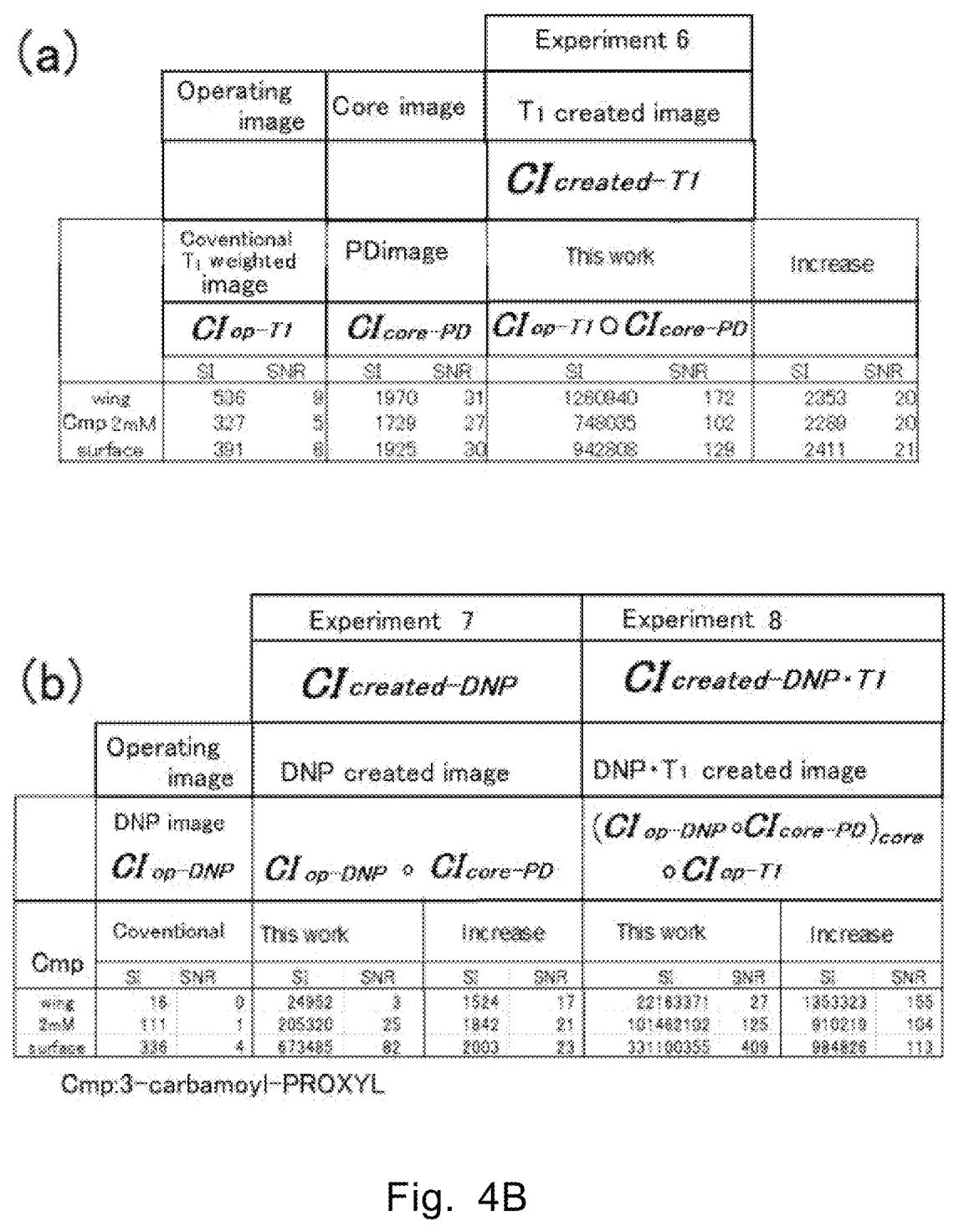

| | Operating image | Core image | T1 created image | | Increase |
|---|---|---|---|---|---|
| | | | Experiment 6 | | |
| | | | $CI_{created-T1}$ | | |
| | Coventional T1 weighted image | PDimage | This work | | Increase |
| | $CI_{op-T1}$ | $CI_{core-PD}$ | $CI_{op-T1} \circ CI_{core-PD}$ | | |
| | SI | SNR | SI | SNR | SI | SNR | SI | SNR |
| wing | 536 | 8 | 1970 | 31 | 1260840 | 172 | 2353 | 20 |
| Cmp 2mM | 307 | 5 | 1729 | 37 | 748035 | 102 | 2269 | 20 |
| surface | 381 | 8 | 1985 | 30 | 942908 | 129 | 2411 | 21 |

(b)

| | | Experiment 7 | | | | Experiment 8 | | | |
|---|---|---|---|---|---|---|---|---|---|
| | | $CI_{created-DNP}$ | | | | $CI_{created-DNP \cdot T1}$ | | | |
| | Operating image | DNP created image | | | | DNP·T1 created image | | | |
| | DNP image $CI_{op-DNP}$ | $CI_{op-DNP} \circ CI_{core-PD}$ | | | | $(CI_{op-DNP} \circ CI_{core-PD})_{core} \circ CI_{op-T1}$ | | | |
| Cmp | Coventional | This work | | Increase | | This work | | Increase | |
| | SI | SNR | SI | SNR | SI | SNR | SI | SNR | SI | SNR |
| wing | 16 | 9 | 24953 | 3 | 1524 | 17 | 22163371 | 27 | 183323 | 155 |
| 2mM | 111 | 1 | 205520 | 35 | 1842 | 21 | 191448192 | 185 | 810219 | 194 |
| surface | 336 | 4 | 873485 | 82 | 2003 | 33 | 331180355 | 409 | 984826 | 113 |

Cmp:3-carbamoyl-PROXYL

Fig. 4B (a)
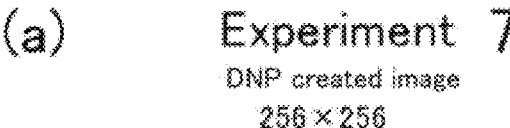
Experiment 7
DNP created image
256×256
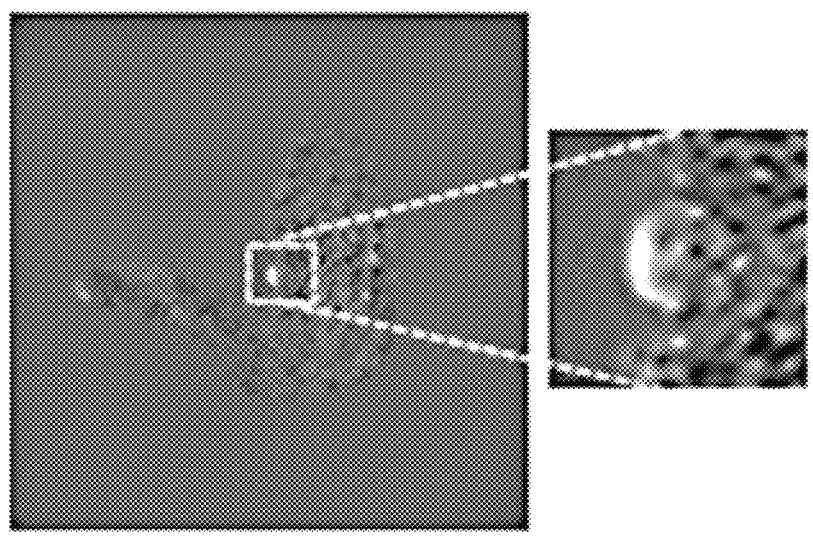
256×256 *CI created-DNP*
(b)
Experiment 9
DNP created image
32×32→ 256×256
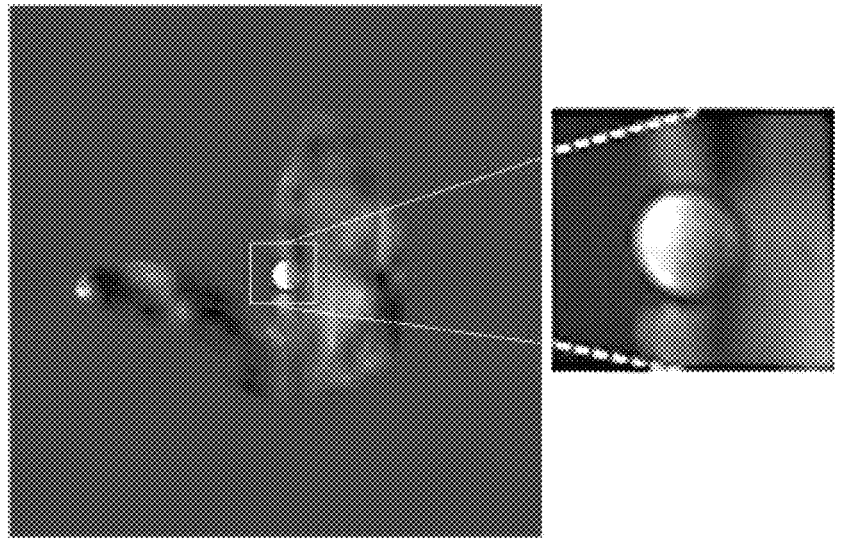
32×32→ 256×256 *CI created-DNP*
Fig. 5B-1

(c)  Experiment 10

DNP · T₁ created image $32 \times 32 \rightarrow 256 \times 256$  *CI created-DNP·T1*

$\left( 32 \times 32 \rightarrow 256 \times 256 \ CI_{op\text{-}DNP} \ \bigcirc \ 256 \times 256 \ CI_{core\text{-}PD} \right)_{core}$ $\bigcirc \quad 32 \times 32 \rightarrow 256 \times 256 \ CI_{op\text{-}T1}$

ANALYSIS SYSTEM AND PRODUCTION METHOD OF ANALYSIS IMAGE

TECHNICAL FIELD

The present invention is an analysis system related to all types of analysis image imaging apparatuses which perform imaging, including a magnetic resonance imaging apparatus (analysis system), (MRI, magnetic resonance imaging), PET (positron emission tomography), CT (computed tomography), an optical microscope imaging apparatus, a confocal microscope imaging apparatus, an electronic microscope, and a mass spectrometry imaging apparatus (Mass Spectrometry Imaging).

Particularly, this description discloses a magnetic resonance imaging apparatus (analysis system) which acquires and images information derived from spin by using a magnetic resonance method (nuclear magnetic resonance, electronic spin resonance, ferromagnetic resonance, and others) and imaging methods thereof.

BACKGROUND ART

An image analysis system is an apparatus which performs visualization on the basis of a two-dimensional or three-dimensional matrix of pixel luminance constituting an image, and the pixel luminance is constituted by signal intensity and noises of an analysis target. Therefore, in the image analysis system, the signal intensity and/or a signal-to-noise ratio of the pixel is preferably high. However, the PET-CT in which the PET and the CT are combined has a problem that a PET image has low resolution. The signal intensity and/or the signal-to-noise ratio depends on an amount, concentration, and observation time of an observation target, and images with low resolution and low luminance by the current image analysis system has limited utilization. Even though it is not such low luminance that utilization of the image is limited, clearer images have been in demand.

For example, proton density (PD) images, $T_1$ weighted images, and $T_2$ weighted images are generally used in the MRI, but the shorter relaxation time becomes, the brighter the $T_1$ weighted image becomes (positive image), and the darker the $T_2$ weighted image becomes (negative image). When there is a paramagnetic material, the relaxation time becomes shorter due to paramagnetic relaxation enhancement (PRE, paramagnetic relaxation enhancement), and it is used as a contrast agent. In functional brain MRI using hemoglobin, which is a paramagnetic material, the $T_2$*weighted images ($T_2$ star weighted images) are used, but there has been a problem of insufficient image luminance A method of increasing a number of integration is employed in order to acquire high luminance, but the luminance is increased only to such a degree that is proportional to a square root of the number of integration and thus, long imaging time was also a serious problem. A chemical shift image also had a problem of lowered resolution since a pixel area becomes wider in order to acquire spectrum information.

The problem that the image acquired from the analysis image imaging apparatus has low luminance and low resolution is not limited to the MRI but has been a universally present problem in any analysis system.

CITATION LIST

Patent Literature

[PTL 1] U.S. Pat. No. 4,891,593
[PTL 2] WO 92/04640

2

[PTL 3] WO 94/03824
[NPL 1] W. Youngdee et al, Optimization of field-cycled PEDRI for in vivo imaging of free radicals, Phys, Med. Biol. 46 (2001) 2531-2544
[NPL 2] D. Lurei et al. Field-cycled PEDRI imaging of free radicals with detection at 450 mT, Magn. Reson. Imaging 23, 175-181(2005)
[NPL 3] George P. H. Styan, Hadamard Products and Multivariate Statistical Analysis, Linear Algebra and Its Application 6: 217-240 (1973)

SUMMARY OF INVENTION

Technical Problem to be Solved by Invention

The present invention has an object to build a new and unprecedented created image with high sensitivity or high resolution.

Solution to Problem

The present invention has solved the aforementioned problem as follows.

An analysis system having an image component part, the image component part including a memory part and an image operation part, the memory part stores at least core image pixel information and operating image pixel information, the core image pixel information and the operating image pixel information include the same sample and the same analysis target region and include a predetermined number of pixels imaged by different imaging systems, the operating image pixel information includes analysis information and is image pixel information with luminance and/or resolution lower than the core image pixel information, and the image operation part builds new created image pixel information by performing operations including Hadamard product for at least one or more pieces of the core image pixel information and at least one or more pieces of the operating image pixel information.

Moreover, the present invention has solved the aforementioned problem as follows.

A production method of an analysis image for building a new created image including: preparing core image pixel information and operating image pixel information, in which the operating image pixel information includes analysis information and is image pixel information with luminance and/or resolution lower than the core image pixel information, the operating image pixel information and the core image pixel information are image pixel information including the same samples and the same analysis target regions and including a predetermined number of pixels imaged by imaging systems different from each other; and performing operations including the Hadamard product for at least one or more pieces of the core image pixel information and at least one or more pieces of the operating image pixel information.

Advantageous Effects of Invention

The analysis system of the present invention can create an unprecedented image in a point that a new image is built by the Hadamard product, not by conventional overlay (superimposing, sum) of images. When the Hadamard product is daringly expressed in comparison with the overlay, the conventional overlay is the sum of two images. On the other hand, the Hadamard product of the present invention is creation of a new image by multiplication of two images for each pixel.

BRIEF DESCRIPTION OF DRAWINGS

FIG. 2 at (a) is the phantom. Images A to C are three images of different imaging systems, and the [image A] is an image under ESR excitation for DNP image acquisition. The [image B] is an image imaged under the same condition as that of the [image A] except ESR non-excitation and is an image called $T_1$ weighted image. The [image C] is a PD image.

FIG. 2C is a table of a result of numerical analysis of signal intensity (SI) and a signal-to-noise ratio (SNR) of the experiment 1.

FIG. 2F is a table of a result of numerical analysis of the signal intensity (SI) and the signal-to-noise ratio (SNR) of the experiment 2 and the experiment 3.

FIG. 3C is a table of a result of numerical analysis of the signal intensity (SI) and the signal-to-noise ratio (SNR) of the experiment 4 and the experiment 5.

FIG. 4B is a table of numerical analysis of the signal intensity (SI) and the signal-to-noise ratio (SNR). FIG. 4B at (a) is a table of a result of the experiment 6, and FIG. 4B at (b) is a table of results of the experiment 7 and the experiment 8.

FIG. 5B-1 are enlarged photos of parts of a created image and a sample (Cmp sealed sample tube of 2 M) acquired in the experiment 7 and the experiment 9 by using a living being sample. FIG. 5B-1 at (a) is a 256×256 DNP created image acquired in the experiment 7, and (b) is a 32×32→256×256 DNP created image acquired in the experiment 9.

FIG. 5B-2 are enlarged photos of parts of a 32×32→256×256 DNP·$T_1$ created image and a sample (2 mM of Cmp sealed sample tube) acquired in an experiment 10 by using a living being sample.

FIG. 5C is a table which sequentially compares the results of the experiment 7 (FIG. 5B-1 at (a)), the experiment 9 (FIG. 5B-1 at (b)), the experiment 8 (FIG. 4A at (c)), and the experiment 10 (FIG. 5B-2 at (c)) in the signal intensity (SI) and the signal-to-noise ratio (SNR).

DESCRIPTION OF EMBODIMENTS

Figure 1A:
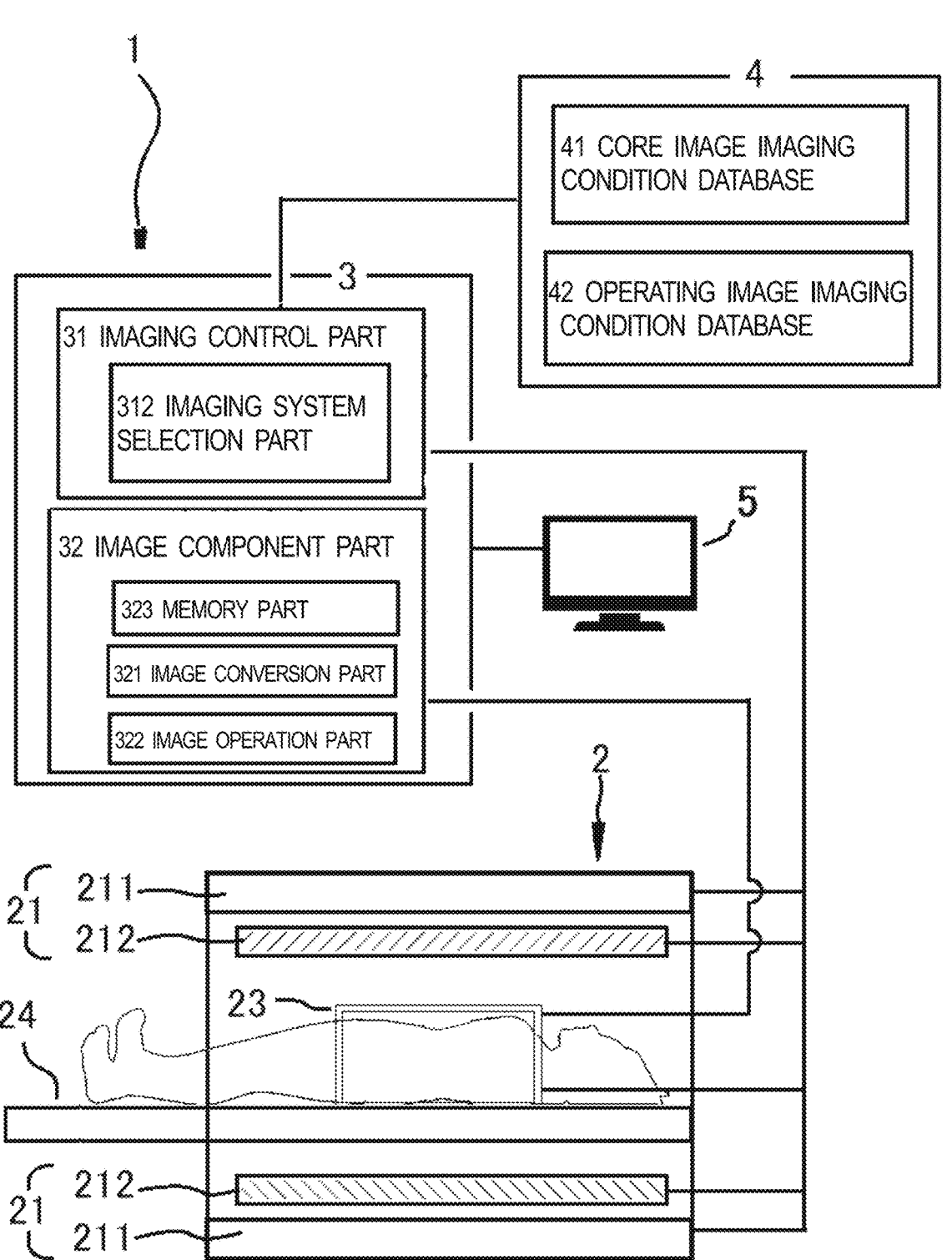
FIG. 1A is a conceptual diagram of a magnetic resonance imaging apparatus (analysis system) 1 of this art.

The applicant exemplifies a magnetic resonance imaging apparatus (analysis system) 1 as an embodiment of the present invention, but it can be applied to analysis image imaging apparatuses other than the magnetic resonance imaging apparatus (analysis system) 1 and does not limit a range of the art. The present invention may be a spectrum analysis system 1 other than the image imaging apparatus.

Before explaining specific examples and various experiments included in embodiments, the applicant will explain a technical principle of the present invention and concepts of Hadamard products and the like.

Some MRI imaging systems have lowered pixel luminance in principle anyway. In order to prevent lowering of pixel luminance, a method of increasing a pixel area, an integration for increasing the number of imaging times and the like have been developed. However, the resolution is lowered in the former case, while imaging time is prolonged in the latter case.

As described above, in the magnetic resonance imaging apparatus (analysis system) 1, there were such cases that detected signal intensity is weak, only unclear images or images with low resolution could be acquired (chemical shift image or the like, for example) depending on the type of spin information to be measured. These problems are present also in the dynamic nuclear polarization (DNP)—MRI (PTL 1) in which electronic spin is imaged. Thus, images including such spin information cannot be analyzed easily, which have hindered utilization.

This art is started by acquiring core image pixel information (core image information) and operating image pixel information (operating image information) acquired by imaging the same analysis region of the same sample by different imaging systems individually or at the same time. And this art builds a new image by performing operations including the Hadamard product for the both types of image pixel information. In the built new images, an image with low luminance imaged by various imaging systems is caused to have higher luminance, and an unclear image and an image with low resolution are caused to have higher solution, and imaging time of an image is reduced.

Regarding the core image pixel information and the operating image pixel information, a plurality of pieces of information can be separately acquired by resolving a spectrum from an image imaged in one session of imaging. This is also included in a concept of "being imaged individually by different imaging systems" referred to in the present invention.

The core image pixel information is image pixel information acquired by an analysis image imaging apparatus and is preferably an image with high resolution or high luminance. The core image pixel information may be an image imaged by any imaging system as long as it is image pixel information with high resolution or high luminance acquired by an analysis image imaging apparatus.

In the case of the core image pixel information acquired by the magnetic resonance imaging apparatus (analysis system) 1, the core image pixel information is an image acquired from some spin information such as spin density, spin polarization or the like. The operating image pixel information includes analysis information and is image pixel information with luminance and/or resolution lower than that of the core image pixel information. In addition, the core image pixel information is an image not including the analysis information or an image which may include the analysis information but does not influence the analysis and is an image with high luminance and/or high resolution.

The core image pixel information and the operating image pixel information may have different imaging systems imaged in the same modality. When the core image pixel information is the imaging system which images nuclear spin information such as MRI, the operating image pixel information may be image pixel information acquired by the imaging system for a positron decay tomography image.

(Notation Using Matrix Mathematical Symbols)

The "matrix" is written in bold and/or italics when noted in mathematical symbols. However, it is specified that patent descriptions cannot be noted in bold or italic. Thus, the mathematical symbol notation of the "matrix" in this description is expressed by underlined alphabets, which are not in bold, as shown in the following [Math. 1].

Moreover, in [Math. 3], the matrix is written in bold italic alphabets.

[Math. 1]

Formal notation using the bold italic style expressing the "matrix":

Example: A, CI

Notation in this description using underlines expressing the "matrix":

Example: A, CI

Moreover, $\overline{T}_1$ used as in $T_1$ weighted image or the like is noted as "T1" due to a font in some cases.

The applicant will explain a theoretical principle of the present invention. An image has a pixel (x, y) in two dimensions and a voxel (x, y, z) in three dimensions as an image element. The applicant will give explanation with the pixel as an example, but it does not exclude three-dimensional image imaging apparatuses. Luminance CI (Contrast Intensity) (x, y) of a pixel (x, y) in an image at certain time t is indicated in [Math. 2] in which Noise (x, y), which is a noise, is added to SI (x, y), which is signal intensity of each pixel.

An image is a group of pixels and can be expressed as shown in [Math. 2].

$$CI(x, y)(t) = SI(x, y)(t) + \text{Noise}(x, y)(t) \qquad \text{[Math. 2]}$$

(Image Pixel Information)

In the case of image pixel information of an image composed by m×n pixels, if m and n are the same number, the image is a regular square, while if not, it is a rectangle. Images to which the present invention can be applied may have any shapes. Moreover, the present invention can be also applied when the pixel itself is a rectangle or other shapes.

The inventor proposes a concept of the core image pixel information and the operating image pixel information.

In the following explanation, the core image and the operating image will be explained as an n×n regular-square image.

The operating image and the core image need to be imaged or acquired for the same analysis target region of the same sample by different imaging systems. The operating image and the core image may be an analysis target region cut out by trimming from an image with a large size. However, the operating image pixel information and the core image pixel information both need to include the same analysis target region.

The operating image pixel information in the matrix notation is written as $\underline{CI}_{op}$ by underlining the matrix with a subscript "op".

The operating image such as a DNP image in an embodiment is an image with weak detected signal intensity and is explained as an example of an image with low resolution.

The matrix notation of the core image pixel information is noted as $\underline{CI}_{core}$ with a subscript "core" given to the matrix. The core image such as a PD image in the embodiment is explained as an example of an image with high resolution or high luminance. The core image pixel information (pixel matrix $\underline{CI}_{core}$) preferably reflects a distribution state of nuclear spin, which is an analysis target, with high luminance and high resolution, when it is subjected to the Hadamard product operation with the operating image pixel information, and the imaging system therefor is not limited.

By performing the Hadamard product (see NPL 3) shown in [Math. 3] from the core image pixel information (pixel matrix $\underline{CI}_{core}$) and the operating image pixel information (pixel matrix $\underline{CI}_{op}$), a new created image with high luminance (pixel matrix $\underline{CI}_{created}$) is acquired.

$$CI_{created} = CI_{core} \circ CI_{op} \qquad \text{[Math. 3]}$$

(The symbol "∘" is an operation symbol indicating the Hadamard product.)

Denoising in image rebuilding is a general problem. In the analysis image imaging apparatus including MRI, various types of information are added and operated so as to provide image pixel information suitable for analysis. In this image pixel information, noises might be enhanced in some cases by operation processing in an image creation process. For example, a DNP image (PTL 1 to 3) is created by a subtracted image (subtracted image) or a ratio image of two images, that is, an image with ESR excitation and an image without it, but the noise is increased by that. Embodiments, which will be described later, include an example using the DNP image using the subtracted image as the operating image pixel information. Various experiments included in the embodiment, which will be described later, prove that the noises contained in the operating image pixel information are reduced and a signal-to-noise ratio can be outstandingly improved by performing the Hadamard product for the operating image pixel information and the core image pixel information with high luminance and high resolution and by building the created image.

The operating image might have low luminance in some cases, and since image luminance increases in proportion to a square root of the number of integration, though the number of integration can be increased imaging time would become longer, and high luminance or high resolution has limitation. As another method, a pixel number of an image analysis region is reduced so as to increase a pixel area in order to enhance a pixel signal or to reduce a noise. For example, imaging of a paramagnetic material in a living body by the DNP-MRI has limitations in output or time of the ESR excitation, and the signal intensity related to the DNP is weak and thus, an analyzable image is obtained by decreasing an encoding number and by increasing the pixel area in low-magnetic field MRI (PTL 1).

A method of using a noise filter or the like has been used for images containing large noise, but when image luminance is low, sufficient effects could not be obtained, and there has not been effective means.

In the present invention, as described above, operation processing including the Hadamard product in [Math. 3] is enabled, and a newly created image with high luminance/ high resolution can be built by means of pixel number conversion (interpolation) so that the number and a position of the pixel matrix of the operating image pixel information is matched with the pixel matrix of the core image pixel information even in an operating image with a small encoding number. The pixel matrix conversion may be conducted in a one-dimensional or multi-dimensional linear interpolation method. Moreover, the core image pixel information and the operating image pixel information need to have the analysis target region contained in the both images matched before performing the Hadamard product operation. For the positioning, pixel movement or affine conversion may be employed.

(Embodiment Related to Analysis Image Imaging Apparatus)

FIG. 1A is a conceptual diagram of a magnetic resonance imaging apparatus (analysis system) 1 and is constituted by an imaging part 2, a control part 3, and a database 4. A photographer (analyzer) takes a photograph of the core image pixel information for an analysis region of an analysis sample by an appropriate imaging system. Around that time, the photographer (analyzer) takes a photograph of the operating image pixel information by an imaging system different from the imaging system which takes a photograph of the core image pixel information for the same sample, the same analysis region as those of the core image pixel information.

The images taken by this apparatus are at least two images including the core image and the operating image, and an image component part which operates the core image pixel information and the operating image pixel information are provided. The control part 3 is a computer in which a program (software) of this art is installed and controls imaging so that one or a plurality of core images and one or a plurality of operating images with changed imaging conditions are imaged.

In the imaging, signal intensity of the core image pixel information may be enhanced by increasing the number of integration by decreasing a flip angle and by using the Ernst angle or by utilizing an arbitrary pulse sequence including balanced steady-state free procession (b-SSFP) or the like.

(Database)

In order to provide an appropriate imaging system to the photographer, a database 4 may be provided. Data accumulated in the database 4 can be utilized when determining imaging conditions.

Selection of the operating image is determined by one or a plurality of pieces of spin information needed by the photographer (analyzer). The photographer (analyzer) inputs an imaging system of the operating image required for an imaging system selection part 312. The photographer (analyzer) can cause information required from an operating image imaging condition database 42 in the database 4 to be displayed on a display 5 connected to the control part 3, when determining the imaging condition of the operating image. In this embodiment, the both databases (41, 42) store at least imaging-condition information, but further inclusion of other types of information is not precluded.

Moreover, it may be so configured that, when the photographer (analyzer) inputs an analysis purpose, the analysis system 1 selects, from the database 4, an imaging system suitable for the analysis purpose and presents it on the display 5.

(Memory Part)

An imaging control part 31 of the control part 3 controls the imaging part 2 in accordance with the determined imaging condition (magnetic field intensity, pulse sequence and the like). An imaging target person is laid on a bed 24, and imaging is started. A static magnetic field generating part 211 creates a static magnetic field around the imaging target. Then, a gradient magnetic field generating part 212 and an electromagnetic-wave transmitting and receiving part 23 in a magnetic field generating part 21 starts imaging by being controlled by the imaging control part 31. When the electromagnetic-wave transmitting and receiving part 23 of the imaging part 2 receives an NMR signal, it sends the NMR signal to an image conversion part 321. The image conversion part 321 images the NMR signal. Imaging is performed again after changing the imaging system, and the core image pixel information and the operating image pixel information are stored in a memory part 323.

(Image Conversion Part)

The imaging part 2 and the image conversion part 321 in the embodiment are explained separately as separate members, but the imaging part 2 may include the image conversion part 321, and a member for imaging may be arbitrary as long as the core image pixel information and the operating image pixel information can be acquired in the end.

Moreover, the MRI in the embodiment needs the image conversion part 321 in order to image the NMR signal received at the electromagnetic-wave transmitting and receiving part 23, but in the case of the analysis system 1 such as an optical microscope, it is only necessary that the imaging part 2 is provided, and the image conversion part 321 is a member provided as necessary.

(Image Adjustment Before Hadamard Product Operation such as Positioning)

Regarding the core image pixel information and the operating image pixel information, both of the image pixel information pieces include at least the same sample (same patient) and the same analysis region. The memory part 323 stores the core image pixel information and the operating image pixel information imaged by the imaging part 2. The imaged images are displayed on the display 5 connected to the control part 3.

The analysis system 1 includes adjustment functions related to an image such as an image editing function, a positioning function, and the like in the control part 3.

Regarding the core image pixel information and the operating image pixel information, only the analysis target region can be cut out by using the image editing function included in the analysis system 1. The editing work can be automatically performed with the image editing function or can be manually performed by the photographer (analyzer) by using the image editing function.

In the case of the positioning, too, it can be automatically performed with the positioning function by using the positioning function included in the analysis system 1 or can be manually performed by the photographer (analyzer) by using the positioning function.

With the positioning function, the core image pixel information and the operating image pixel information can be displayed in separate colors so as to assist positioning. The photographer (analyzer) selects either one of the core image pixel information and the operating image pixel information and performs movement or deformation so as to position at least the analysis target regions of the both images. It is needless to say that the photographer (analyzer) may perform the positioning for all the image regions.

Regarding the positioning function, various methods such as pixel movement, affine transformation and the like have been developed, and it is preferable that appropriate positioning means is employed depending on the image to be used.

The imaging is preferably performed by giving a marker for facilitating the positioning.

The image adjustment function such as the positioning and the like in the present invention only needs to be included in the analysis system 1 as a function, regardless of an execution entity, whether it is automatic or manual.

It is to be noted that the positioning only needs to be a substantial position, and strict positioning is not required in some cases. Moreover, when an image not requiring the positioning is to be acquired by the imaging part 2, there is no need to perform the positioning.

The core image pixel information and the operating image pixel information having been image-adjusted are sent to the memory part 323 again and stored and then, sent to an image operation part 322. The core image pixel information and the operating image pixel information having been sent to the image operation part 322 are subjected to operations including the Hadamard product.

After the positioning, the operating image pixel information and the core image pixel information are subjected to the Hadamard product operation by the image operation part 322 so that the created image is built.

The image operation part 322 includes other functions for performing operations such as denoising, color allocation and the like other than the Hadamard product. The photographer (analyzer) can process the created image pixel information so as to be analyzed easily by using this function.

The control part 3 executes control such that the new image operated by the image operation part 322 is displayed on the display 5.

The image component part 32 may build an image expressing the analysis target region included in the created image in a form discriminated from the surrounding. The discriminable form includes hatching, color and the like.

(Functional Part Included in Analysis System)

Functional parts such as the image component part 32 and the like do not have to be present as substantial objects but may be a group of a plurality of computers built on a cloud. Moreover, it may be software which operates a plurality of computers as appropriate so that the computers function in collaboration as the image component part 32, the image conversion part 321, and the image operation part 322. The expression " . . . part" indicated in the embodiment does not have to be present as a clear substantial object but refers to the one substantially functioning as the image component part 32, the image conversion part 321 or the image operation part 322.

(Different Imaging System)

The "different imaging system" referred to in the present invention includes different modalities such as MRI and X-ray CT and the like.

Moreover, the core image pixel information can be a face photo, and the operating image pixel information can be a "wrinkle-enhanced image pixel information" imaged by using a light source including light with a special wavelength or a light source emitting light from a special direction in order to enhance the wrinkles on the face.

Furthermore, the "different imaging system" referred to in the present invention also includes those obtained by creating two images including different pieces of information by decomposing different information such as spectrum from one image and having a side including the analysis information as the operating image pixel information and the other as the core image pixel information.

Embodiment 1

Embodiment 1 may be a high-sensitivity/high-resolution imaging method or an analyzing method of magnetic information of target nuclear spin by acquiring each of the operating image pixel information and the core image pixel information on the basis of the magnetic information of detected nuclear spin in a sample by using magnetic resonance under a magnetic field environment and by operating the both pieces of the information.

The method in Embodiment 1 has a step of acquiring the core image pixel information with high luminance/high resolution on the basis of nuclear magnetization in the sample and/or relaxation information.

The method in Embodiment 1 has a step of acquiring and/or creating the operating image pixel information on one or a plurality of pieces of information including dynamic nuclear polarization information, relaxation speed information, diffusion information, perfusion information, magnetic susceptibility information, chemical shift information and the like.

The method in Embodiment 1 has a step of acquiring an electronic spin information image, a relaxation time image, a diffusion image, a perfusion image, a magnetic susceptibility image of an image derived from a chemical shift by executing operation processing such as the Hadamard product of the operating image pixel information with respect to the core image pixel information.

Embodiment 2

In addition to Embodiment 1, a method characterized in that the operating image pixel information was created by acquiring a change in the pixel signal intensity related to one or a plurality of the dynamic nuclear polarization, the relaxation phenomenon, the diffusion phenomenon, the magnetic susceptibility, the chemical shift and the like.

Embodiment 3

In addition to the embodiments described above, a method in which the change in the pixel signal intensity is a signal intensity difference or a signal intensity ratio, algebraic processing such as addition, subtraction, multiplication, division, logarithm and the like, and the change is acquired by a function processing operation including filtering processing.

Embodiment 4

In addition to the embodiments described above, a method characterized in that the operating image pixel information based on the dynamic nuclear polarization information is acquired on the basis of ESR-excitation and non-excitation image pixel information, and the electronic spin information is specified by the image pixel information of the ESR excitation.

Embodiment 5

In addition to the embodiments described above, a method characterized in that the operating image pixel information based on the diffusion information or the magnetic susceptibility information is acquired on the basis of the $T_2^*$($T_2$ star) image pixel information and/or the phase image pixel information.

Embodiment 6

In addition to the embodiments described above, in acquisition of the operating image pixel information, the operating image pixel information is acquired by reducing the matrix number including reduction of the encoding number. After that, a process of performing matrix number conversion (pixel interpolation) may be included so that the image with the reduced matrix number matches the matrix number of the core image pixel information.

Embodiment 7

In addition to the embodiments described above, in acquisition of the image targeted for the nuclear-spin chemical shift, the core image pixel information with high luminance/high resolution can be based on an image of nuclear magnetization of a targeted specific nuclear spin. The image is acquired by utilizing a nuclear overhauser effect and/or spin decoupling, a fat-signal suppression method, and one or a plurality of phenomena including the relaxation phenomenon. And the operating image pixel information is acquired on the basis of the image pixel information with a small matrix number obtained from the image including images of the chemical shift image (CSI), a metabolic rate, and a ratio of metabolites. Then, the created image is acquired by operating the operating image pixel information with respect to the core image pixel information with high luminance/high resolution. Alternatively, in addition to the nuclear spin-core image pixel information, a proton image may be used at the same time as the core image pixel information.

Note that, in the embodiments described above, an execution order of each step is not limited to the order described in each step.

Embodiment Example 1

An experiment conducted in Embodiment Example 1 has an image created from relaxation promotion information by a paramagnetic material and the dynamic nuclear polarization information as the operating image pixel information. The core image pixel information uses proton-density pixel image pixel information (PD image pixel information) or $T_1$ weighted image pixel information. The used magnetic resonance imaging apparatus (analysis system) 1 is FC-DNP-MRI (PTL 2, 3, NPL 1, 2). A fixed magnetic field DNP-MRI (PTL 1) can be diverted for embodying of the present invention, and when the relaxation promotion information is used as the operating image pixel information, the fixed magnetic field MRI can be diverted. In the analysis system 1 of the present invention, forms do not matter as long as the core image pixel information and the operating image pixel information can be acquired. The analysis system 1 can be realized by connection to an existing MRI apparatus, coupling with the imaging part 2, input of only the imaged image pixel information and the like.

The following experiment was conducted as an example using only the imaged image pixel information.
(Pulse Sequences Used in Experiments)

Figure 1B:
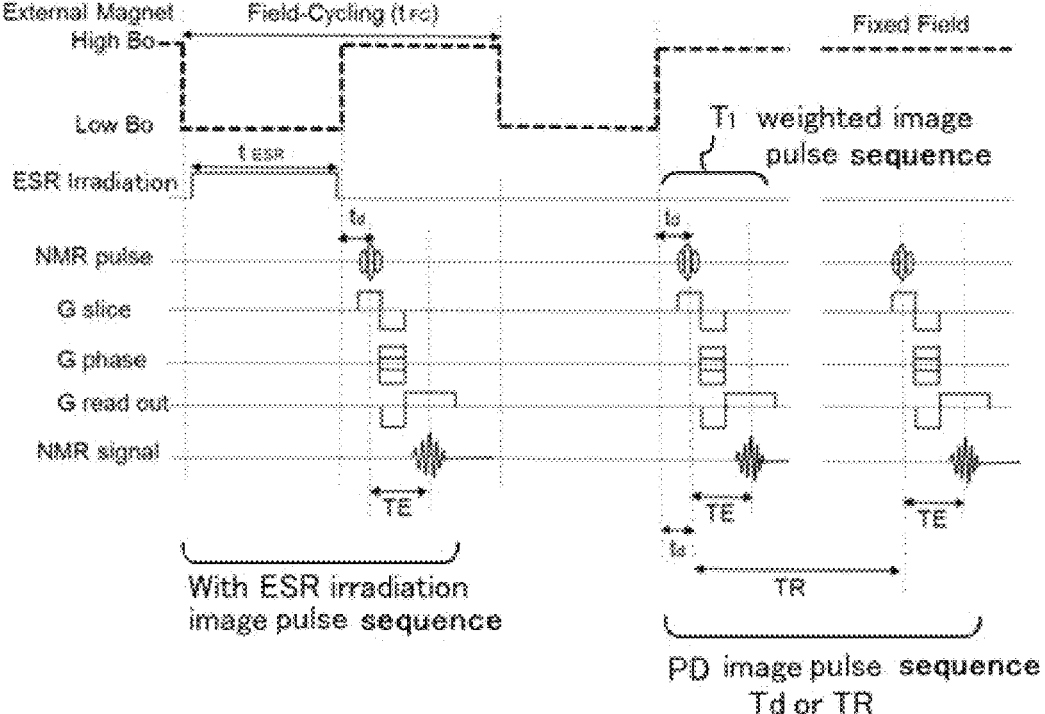
FIG. 1B is an explanatory diagram of a pulse sequence.

FIG. 1B is an explanatory diagram of a pulse sequence. The pulse sequence in FIG. 1B illustrates the pulse sequence used in the following experiments. The pulse sequence of ESR excitation image imaging in FIG. 1B starts at the ESR excitation for 1300 milliseconds in a low magnetic field (5 mT). In the imaging, an NMR excitation electromagnetic wave is transmitted at time td=200 milliseconds, supposing that a point of time of conversion to a high magnetic field (300 mT) is 0 seconds, and subsequently, the NMR signal is received during TE (echo time) time in a gradient magnetic field and then, imaging is conducted while the gradient magnetic field is changed and phase encoding is performed. Moreover, the pulse sequence of the ESR non-excitation image imaging starts at the ESR non-excitation for 1300 milliseconds in the low magnetic field (5 mT) and then, conducted similarly to the ESR excitation image imaging.
(Pulse Sequence for Acquiring Operating Image Pixel Information)

Note that the image pixel information of the ESR excitation image and the image pixel information of the ESR non-excitation image ($T_1$ weighted image) are original images used in order to acquire the DNP operating image pixel information.

The pulse sequence in FIG. 1B was selected for the experiment, and it is needless to say that the present invention is not limited to the pulse sequence in FIG. 1B. Moreover, the pulse sequence in FIG. 1B is illustrated as an example to be used in the FC-DNP-MRI which was used.

For the image pixel information in the $T_1$ weighted image imaging, the ESR non-excitation image pixel information may be used, or alternatively, the image pixel information of the image imaged in repetition time (TR) for the $T_1$ weighted image may be used by fixing to the high magnetic field (300 mT).
(Pulse Sequence for Acquiring Core Image Pixel Information)

For the core image pixel information, the image pixel information of the PD image (proton-density image) or the $T_1$ weighted image may be used. In the pulse sequence for imaging the PD image (proton-density image) by fixing to a high magnetic field (300 mT), and when echo is used, the TR is made longer than the pulse sequence for imaging the $T_1$ image. The imaging is performed such that the NMR excitation electromagnetic wave is transmitted after TR (200 milliseconds) has elapsed, an NMR signal is received in TE time by using a frequency encode after the phase gradient magnetic field is given and then, after the TR, the gradient magnetic field is changed, while the phase encoding is performed.

If TR is shorter than a vertical relaxation time, the $T_1$ weighted image is acquired, while if TR is longer than twice of the vertical relaxation time, the PD image is acquired. If TR is as short as approximately one several tenth of the vertical relaxation time, it becomes a vertical relaxation approximate image.

Experiment 1

Figure 2A:
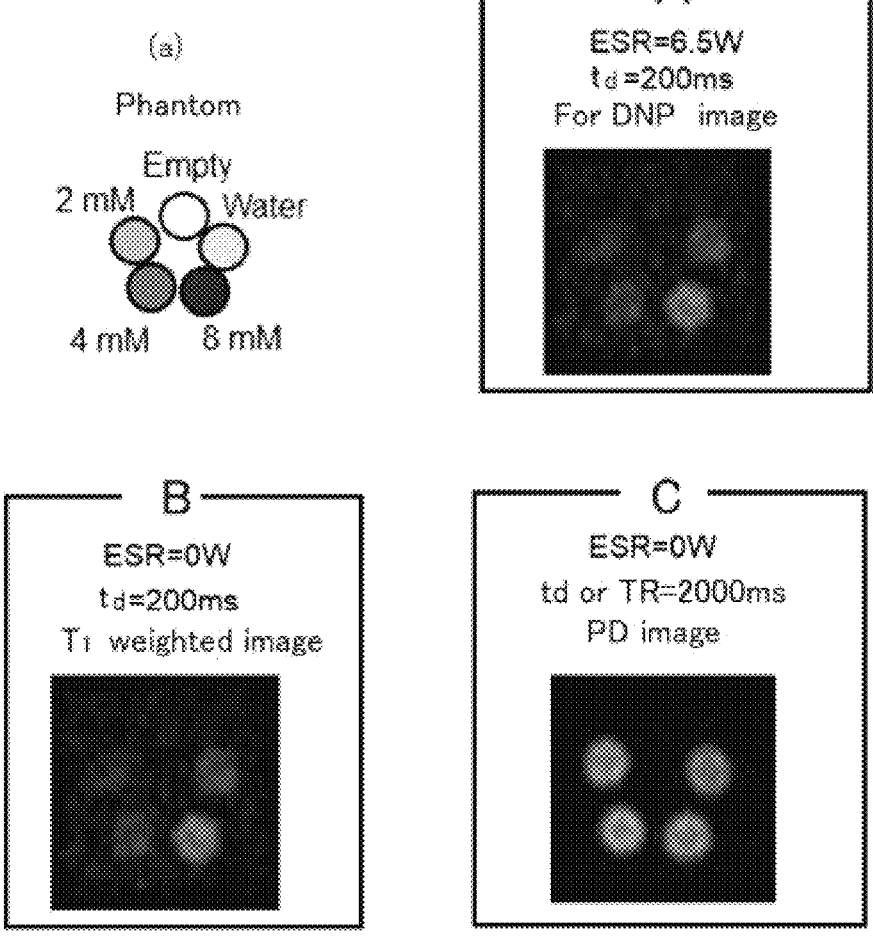
FIG. 2A is an explanatory diagram of a phantom and an actual image and the like for an experiment.
Figure 5A:
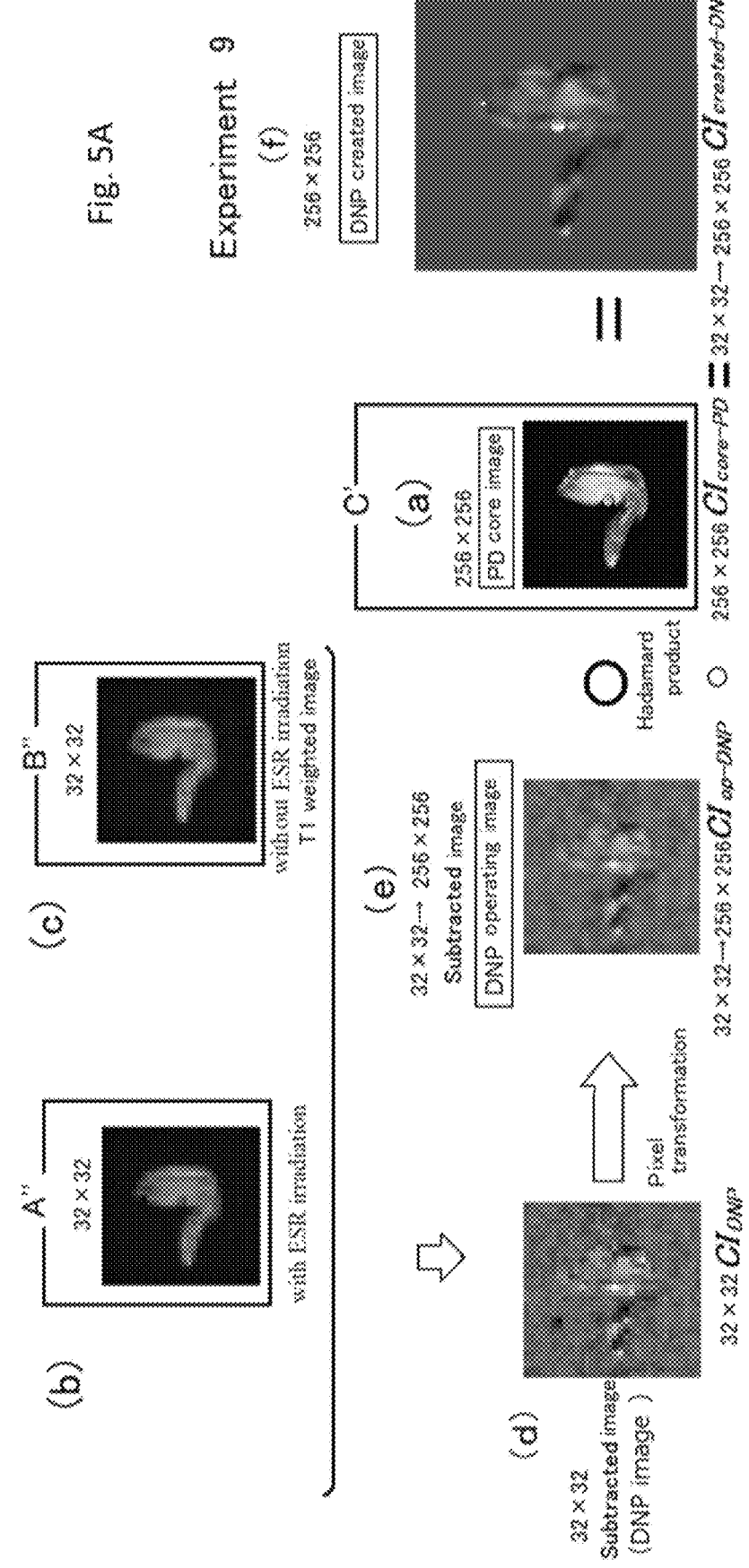
FIG. 5A is an explanatory diagram of an experiment 9 by using a living being sample and explains a creation process of 32×32→256×256 DNP created image built from an encode image (32×32) smaller than the experiment 7.
Figures 2, 5B:
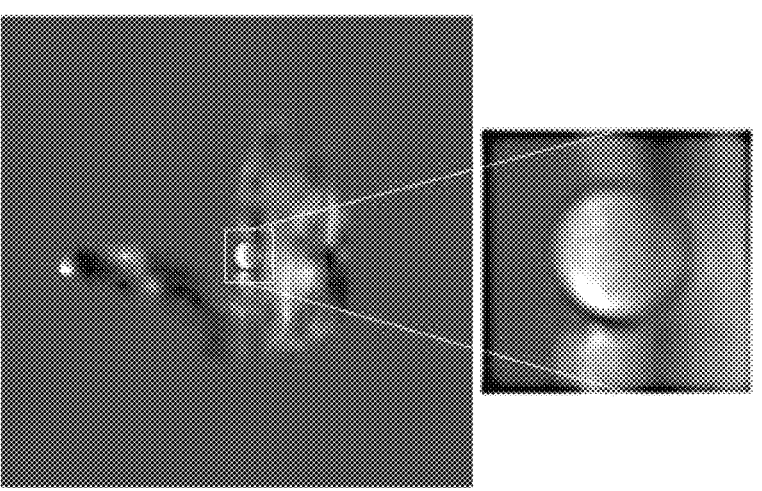

FIG. 2A is an explanatory diagram of a phantom and actual images and the like offered for experiments. FIG. 2 at (a) is the phantom. The images A to C are three images of the different imaging systems, in which the [Image A] is an image under the ESR excitation for DNP image acquisition. The [Image B] is an image in the same condition as that of A except that it is ESR non-excitation and is an image called a $T_1$ weighted image. The [Image C] is a PD image.

The phantom in FIG. 2A at (a) shows five sample tubes in which the following substances are put. The substances put into the sample tubes are, in a clockwise order, air (Empty), pure water (Water), paramagnetic material Cmp (3-carbamoyl-PROXYL) solutions with concentration of 2 mM, 4 mM, and 8 mM.

These images were all acquired with TE=7 milliseconds, flip angle=90 degrees, band width=30 kHz, number of integrations=1, phase encoding number=160, frequency encoding number=160, slice thickness=5 mm, and matrix number of 256×256. The following experiments were conducted with a purpose of illustrating that various created images with high resolution and high luminance can be created from only three images of the images A to C. The images A to C are those from which only the analysis target regions are cut out of the imaged images.

The imaging conditions are as explained in the [Pulse sequences used in experiments] described above.

In embodying the present invention, the photographer (analyzer) prepares two images imaged by different imaging systems. One of them is assumed to be the core image, while the other to be the operating image. The core image is an image with luminance and/or resolution higher than those of the operating image.

The images prepared in the experiment 1 are two images, that is, the $T_1$ weighted image [B image] and the PD image [C image] in FIG. 2A.

Figure 2B:
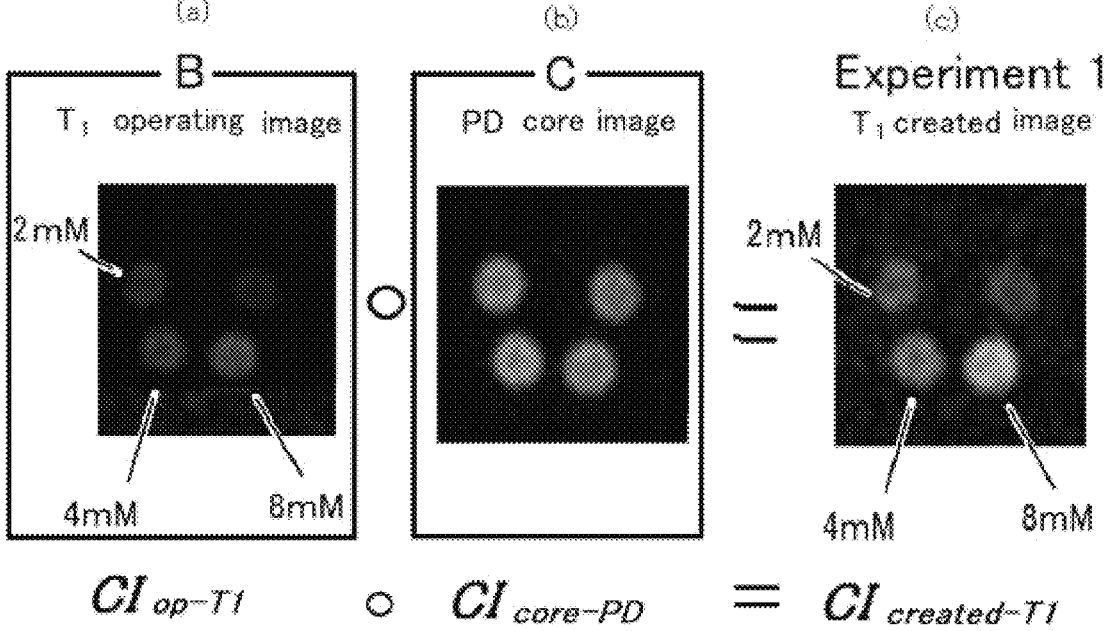
FIG. 2B is an explanatory diagram of the $T_1$ created image built in an experiment 1.

FIG. 2B is an explanatory diagram of the experiment 1. The $T_1$ weighted image in FIG. 2A ([B image]) has whiteness enhanced as its Cmp concentration increases, and though it is an image with Cmp concentration dependency, it is known that contrast is not clear and the image has low resolution and low luminance. On the contrary, the PD image in FIG. 2A ([C image]) has substantially the same luminance with the Cmp concentration of 2 mM, 4 mM, 8 mM, and water (0 mM) but is an image with resolution and luminance higher than those of the $T_1$ weighted image ([B image]) in FIG. 2A.

Thus, as shown in FIG. 2B, the inventor used the PD image in the [C image] in FIG. 2A for the core image and the T1 weighted image in the [B image] in FIG. 2A for the operating image.

The [B image] and the [C image] in FIG. 2B are the same images in those in FIG. 2A.

The $T_1$ operating image pixel information in the [B image] in FIG. 2B at (a) and the PD core image pixel information in the [C image] in FIG. 2B at (b) are subjected to the Hadamard product operation after being positioned and as a result, $T_1$ created image pixel information shown in FIG. 2B at (c) was acquired. The ○ symbol in the figures denotes an operation symbol by the Hadamard product.

Each image pixel information can be expressed in pixel matrix as ($\underline{CI_{op\text{-}T1}}$) and ($\underline{CI_{core\text{-}PD}}$). And by operating:

$$CI_{op-T1} \circ CI_{core-PD} = CI_{created-T1}$$

$T_1$ created image pixel information ($\underline{CI_{created\text{-}T1}}$) can be acquired.

Note that the created image acquired in the experiment 1 was named as "$T_1$ created image". The naming of the "created image" is up to the photographer (analyzer). For example, in a case of a landscape photo with a person shot, how it is grasped, a photo of a person, a photo of clothes or a photo of a building in a background is determined by an imaging purpose of the photographer. Moreover, there is a case in which the created image is named in this description, but this is to facilitate the explanation. Naming has nothing to do with the present invention in essence. In any case, the created image built in the present invention is a totally unknown image. One created image can be used for various analysis purposes.

In the $T_1$ operating image in FIG. 2B at (a) ([B image]), the luminance of the four sample tubes was not clear, but the $T_1$ created image in FIG. 2B at (c) had the four sample tubes with high luminance and a clear luminance difference according to the Cmp concentration, and paramagnetic relaxation enhancement was visualized.

FIG. 2C is a table of results of numerical analysis of the signal intensity (SI) and the signal-to-noise ratio (SNR) in the experiment 1. MRI region of interest (ROI: Region of Interest) was set to a sample tube region and a space noise region in each image in FIG. 2B, luminance was acquired by analysis software ImageJ provided by National Institutes of Health (NIH), and the SI and the SNR were acquired in accordance with the AAPM Report. In the following experiments, numerical analysis results of the signal intensity (SI) and the signal-to-noise ratio (SNR) are shown as tables, where the numerical analysis was executed using the method described above.

Visual evaluation was backed by numerical analysis results in FIG. 2C as follows.

The SI of the $T_1$ created image acquired by the Hadamard product has Cmp concentration dependency and has a 2000-times rise of the SI of the $T_1$ weighted image ([B image]) as a comparison target. Moreover, the signal-to-noise ratio (SNR) of the $T_1$ created image increases approximately 20 times of that of the $T_1$ weighted image ([B image]) as the comparison target. This result is an important point of the present invention. The $T_1$ weighted image ([B image]) by a conventional method and used as the operating image has the signal-to-noise ratio (SNR) at 10 or less, and an influence by a noise was remarkable.

Such improvement of the signal-to-noise ratio (SNR) cannot be realized by image overlay (image by summing operations) which has been conventionally used in many cases.

The $T_1$ created image has become an image (created image) in which a noise contribution part having been present in the operating image is relatively reduced by the Hadamard product operation of the pixel information of the operating image and the pixel information of the core image.

Note that this effect was made clearer by the experiment which will be described later.

Experiment 2

The experiment 2 and the experiment 3 are experiments of dynamic nuclear polarization information.

The magnetic resonance imaging apparatus (analysis system) 1 which images a paramagnetic material was developed by Lurie et al. (PTL 1).

Lurie et al. developed a DNP-MRI method (PTL 1) in which hydrogen nuclear spin of a water molecule, which is hyperfine-coupled with the paramagnetic material, is subjected to dynamic nuclear polarization (DNP, dynamic nuclear polarization) by exciting polarization of the paramagnetic material under a static magnetic field by electronic spin resonance (ESR), whereby the hydrogen nuclear spin is visualized. Moreover, they also developed a magnetic field conversion method DNP-MRI (Field Cycling DNP MRI: FC-DNP-MRI) in which the ESR excitation is performed in a low magnetic field, and the nuclear spin polarization and detection in a high magnetic field (see PTL 2, 3, NPL 1, 2, for example). However, the conventional FC-DNP-MRI shown in PTL 2, 3 was realized only by diverting the magnetic field fixed type DNP-MRI (PTL 1) to the FC-DNP-MRI as it is, and it is premised on a steady condition. And the conventional FC-DNP-MRI has problems in theoretical analysis related to a magnetization change or an influence on luminance under the imaging condition, and acquired image luminance was not sufficient.

The experiment 2 is an experiment for examining whether the DNP created image is improved from the DNP image of the conventional method ([E image]).

Figure 2D:
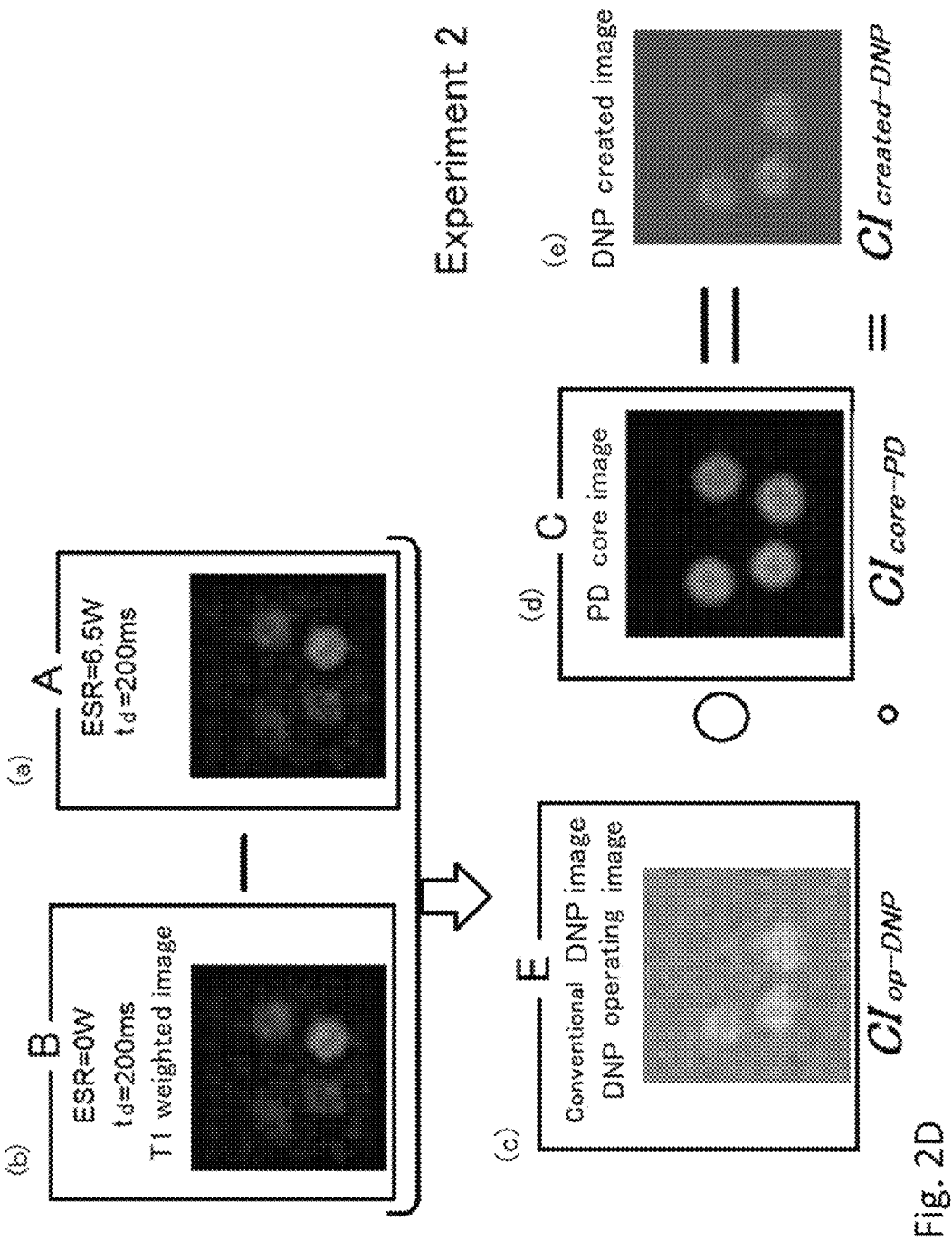
FIG. 2D is an explanatory diagram of a DNP created image built in an experiment 2.

FIG. 2D is an explanatory diagram of the experiment 2.

Images used in the experiment 2 are three images in FIG. 2A, that is, [A image], [B image], and [C image].

The DNP (dynamic nuclear polarization) image ([E image]) by the conventional method was imaged by the DNP image method (see NPL 1 and 2) by Lurie et al. The DNP image ([E image]) is acquired by positioning the ESR excitation [image A] and the ESR excitation [image B] and then, by operating subtraction (subtraction) for each corresponding pixel.

The acquired DNP image ([E image]) is shown in FIG. 2D at (c). The background is whitened because pixel luminance is a noise and negative when the subtraction of ESR excitation image ([A image])·ESR=6.5 W]) from the ESR non-excitation image ([B image] ESR=0 W) was operated (subtraction). As is known by viewing, the DNP image ([image E]) is an unclear image without clear contrast, and particularly the background looks like boiling water due to noises. In the experiment 2, this DNP image is an image by the conventional method and is used as a comparison target.

In the experiment 2, this unclear DNP image ([image E]) is assumed to be the DNP operating image pixel information ($CI_{op\text{-}DNP}$), and as the core image pixel information, the PD image [C image] pixel information ($CI_{core\text{-}PD}$) was adopted similarly to the experiment 1. The both images were positioned and then, are subjected to the Hadamard product operation, whereby the DNP created image pixel information ($CI_{created\text{-}DNP}$) in FIG. 2D at (e) was acquired.

As is known from viewing, unclearness by the noises disappeared in the background of the DNP created image in FIG. 2D at (e), and the sample seems to be floated. Moreover, in the PD core image [image C] in FIG. 2D at (d), the water sample was imaged with high luminance but it totally disappeared in the DNP created image in FIG. 2D at (e). The DNP image ([image E]) can image the Cmp in principle, but it was found out that the concentration dependency is low in this concentration range. This derives from a phenomenon that the DNP effect by the ESR excitation hits a peak due to the concentration of the paramagnetic material.

Experiment 3

Figure 2E:
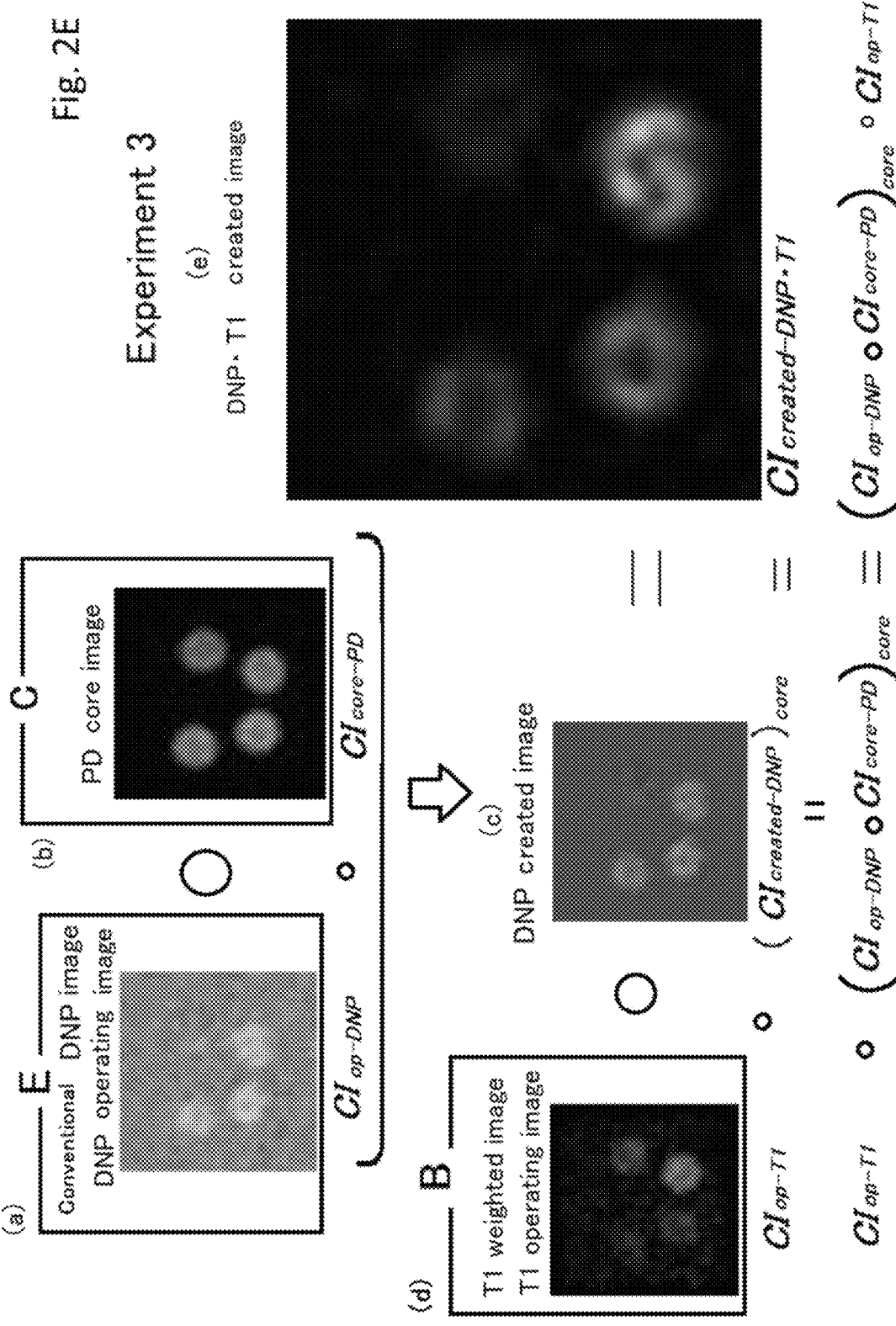
FIG. 2E is an explanatory diagram of a DNP·$T_1$ created image built in an experiment 3.

FIG. 2E is an explanatory diagram of the experiment 3. In the experiment 3, when it is assumed that the DNP created image itself is a new core image, and the $T_1$ weighted image [B image] acquired by the imaging system different from that is the operating image, what result is obtained was examined.

The $CI_{op\text{-}DNP} \circ CI_{core\text{-}PD}$, which are DNP created images acquired in the experiment 2 was used as the core image pixel information in the experiment 3.

The DNP·$T_1$ created image newly built by $(CI_{op\text{-}DNP} \circ CI_{core\text{-}PD})_{core} \circ CI_{op\text{-}T1}$ is shown in FIG. 2E at (e).

In the $T_1$ created image in the experiment 1, the Cmp concentration dependency was clearly observed, but its peculiarity has a problem such that a water sample is reflected or the like. On the other hand, in the DNP created image in the experiment 2, the Cmp dependency was not clear, but the Cmp has peculiarity, and the water sample was not reflected.

In the acquired DNP·$T_1$ created image (FIG. 2E at (e)), as compared with the DNP created image (FIG. 2D at (e)), the Cmp concentration dependency is strongly recognized, and water is not shown in the image, which made clear that the image was suitable for analysis.

Visual evaluation confirms the following by numerical analysis results in FIGS. 2D and 2E.

FIG. 2F shows a table of results of numerical analysis of the signal intensity (SI) and the signal-to-noise ratio (SNR) in the experiment 2 and the experiment 3.

As is known from a column in the results in the experiment 2, as compared with the DNP image ([image E]), which is the conventional method used in detection of the paramagnetic material, the DNP created image (operation of $CI_{op\text{-}DNP} \circ CI_{core\text{-}PD}$) obtained increases of 1800 times for the signal intensity and 20 times for the signal-to-noise ratio.

In the DNP·$T_1$ created image (operated with $(CI_{op\text{-}DNP} \circ CI_{core\text{-}PD})_{core} \circ CI_{op\text{-}T1}$) in the experiment 3, an image with astonishingly high luminance with 1,400,000 times in the signal intensity and 160 times in the signal-to-noise ratio as compared with the conventional method was acquired, and the paramagnetic-material concentration dependency, which was not clear in the DNP created image, was clearly visualized as the signal intensity.

As described above, since the signal intensity and the signal-to-noise ratio of the created image are massively increased, imaging time to of the operating image can be reduced to one tenth or less, whereby the imaging time could be drastically shortened.

Through the experiment 1 to the experiment 3, the PD image ([C image]) adopted as the core image is an image indicating the proton density and thus, it does not have concentration dependency of substances other than proton. Thus, it was known that the PD image ([C image]) is an image with high usability as the core image in analysis using the MRI.

(Core Image Pixel Information and Operating Image Pixel Information)

What are to be selected as the core image pixel information and the operating image pixel information can change depending on an analysis purpose.

Supposing that the analysis purpose of the experiment 3 is to know the Cmp concentration, the analysis information is the Cmp concentration. The DNP image in the [Image E] and the $T_1$ weighted image in the [image B] are both images having the Cmp concentration dependency more or less and thus, they are suitable as the operating images.

On the other hand, the PD image in the [image C] depends on the proton concentration and does not have the Cmp concentration dependency and thus, it is suitable as the core image pixel information. It was known that the PD core image pixel information serves a role of amplifying the analysis information.

Regarding the core image pixel information, if there is no appropriate imaging system which gives an image with high luminance and high resolution, artificial core image pixel information can be also built by operating the Hadamard product for two or more of plural different images. As the result of the Hadamard product operation, if the finally build image does not include the analysis information or does not influence the analysis, the image pixel information can be used as the core image pixel information.

On the other hand, the operating image pixel information includes the analysis information but does not include the analysis target region with luminance and/or resolution higher than those of the core image pixel information. The operating image pixel information may be two or more of plural different pieces image pixel information by the different imaging systems as in the experiment 3.

Experiment 4, Experiment 5

The experiment 4 and the experiment 5 were conducted with the imaging system with the operating image having the encoding number reduced by using a kitchen rubber glove (polyvinyl alcohol enclosed) resembling a human arm in another verification example in which imaging time was made shorter than that of the experiment 2.

The phantom is created by installing two sample tubes (outer diameter: 13 mm, height: 30 mm) in which water or a 2 mM of Cmp free radical solution is enclosed below the kitchen rubber glove (polyvinyl alcohol enclosed), and the sample tube in which 2 mM of the Cmp free radical solution is enclosed is attached in the ESR excitation coil.

As the magnetic resonance imaging apparatus (analysis system) 1 used in the experiment 4, the FC-DNP-MRI was selected similarly to the experiment 1. And the imaging condition of the original image to be the operating image is similar to that of the experiment 1, and the NMR signal was detected by the pulse sequence shown in FIG. 1B. However, the core image is an image of the imaging system different from that of the experiment 1. The imaging conditions of the core image were TR=500 milliseconds, the flip angle=60 degrees, a band width=20 kHz, the phase encoding number=65, the frequency encoding number=96, the slice thickness=5 mm, and the matrix number of 128×128.

Figure 3A:
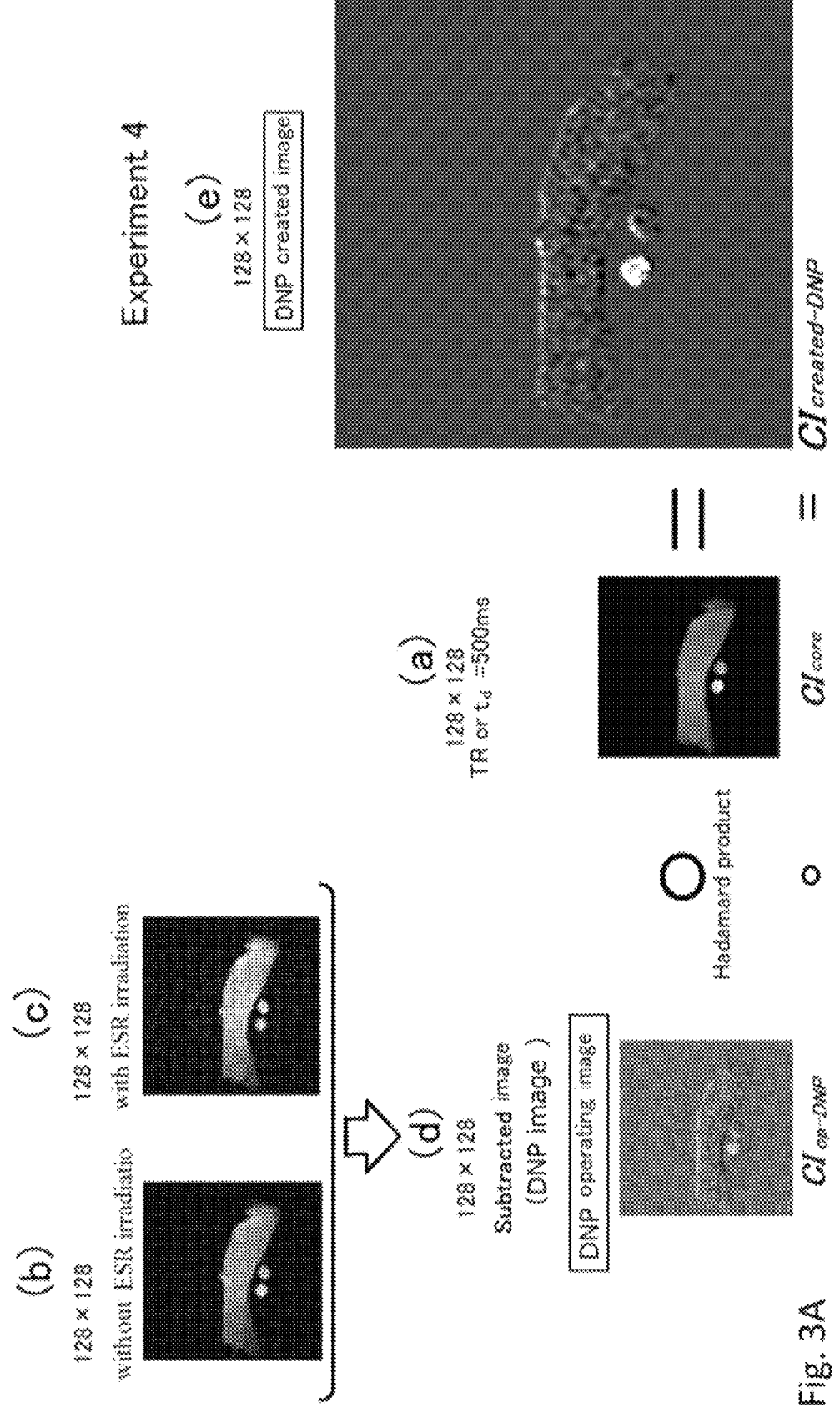
FIG. 3A is an explanatory diagram of a DNP created image built with a glove for a human in an experiment 4.

The photo in FIG. 3A at (a) of the experiment 4 is a core image imaged with TR=500 milliseconds, the photo in FIG. 3A at (b) is an image acquired with td=200 milliseconds, without executing ESR excitation, that is, a so-called the $T_1$ weighted image, and FIG. 3A at (c) is an image imaged with td=200 milliseconds, after the ESR excitation (ESR=6.5 W for 1300 milliseconds) is executed.

FIG. 3A at (d) is a subtracted image (the DNP image of the conventional method) of the pixel information of the ESR non-excitation image in FIG. 3A at (b) and the pixel information of the ESR excitation image in FIG. 3A at (c) and was used as a comparison target. And this image was selected as the DNP operating image of the experiment 4.

The core image pixel information in FIG. 3A at (a) and the DNP operating image pixel information in FIG. 3A at (d) were subjected to the Hadamard product operation, and the DNP created image in FIG. 3A at (e) was built.

In the DNP created image in FIG. 3A at (e), the background in the image is clear, and the image of the Cmp sealed sample tube has the SI by approximately 10,000 times and the SNR by approximately 40 times increased as compared with the DNP image by the conventional method and has become an outstandingly high luminance image (see FIG. 3C, which will be described later).

Figure 3B:
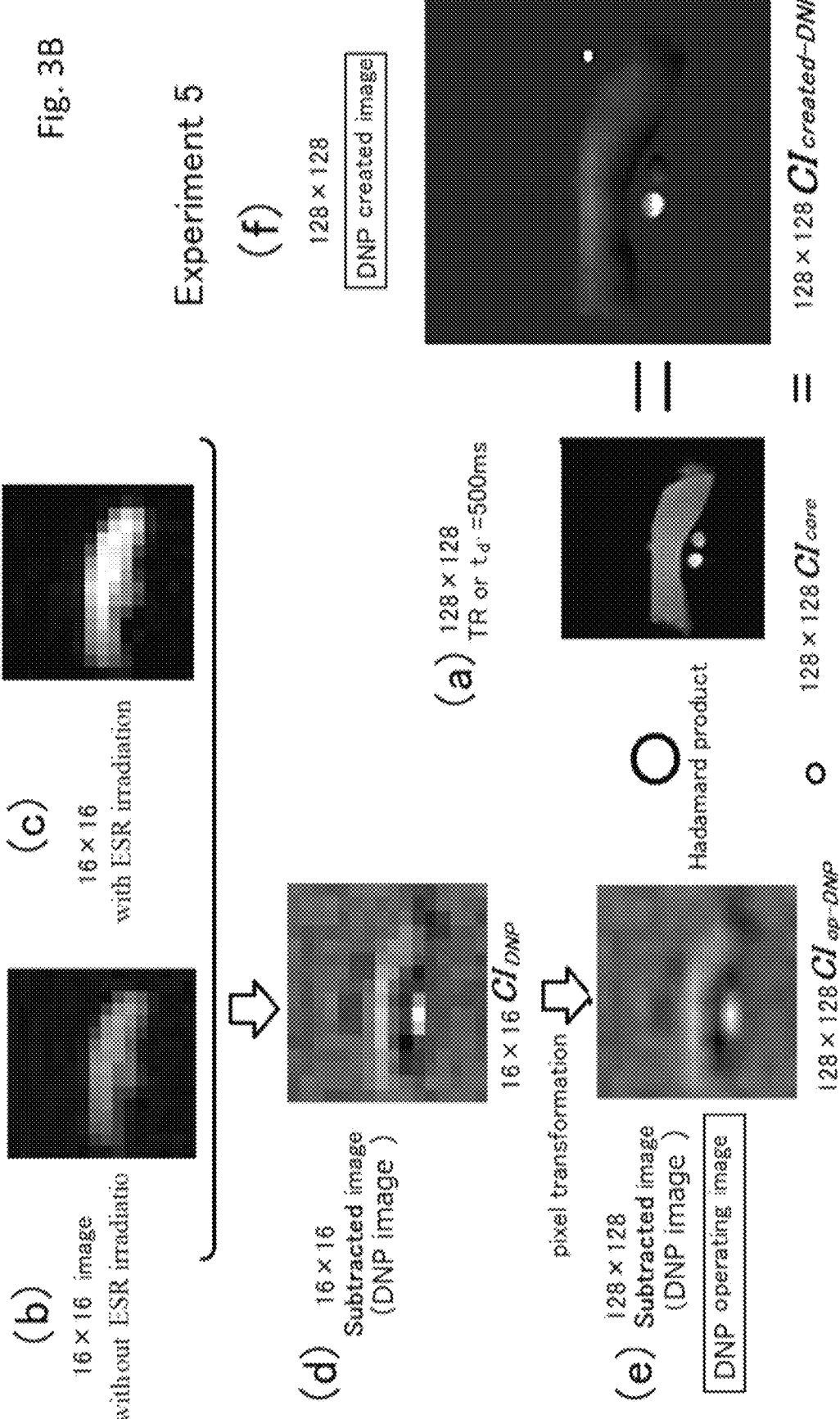
FIG. 3B is an explanatory diagram of a 16×16→128×128 DNP created image built from an encode image (16×16) smaller than that in the experiment 4 in an experiment 5.

FIG. 3B is an explanatory diagram of the experiment 5. The experiment 5 is the same phantom as that of the experiment 4 with the same conditions as those in the experiment 4 except that the imaging encoding number is 16×16. The inventor imaged two pieces of the original image with the matrix number of 16×16 in order to create the DNP image. That is, FIG. 3B at (b) is an image imaged by the ESR non-excitation ($T_1$ weighted image), and FIG. 3B at (c) is an image imaged by the ESR excitation. In order to acquire the DNP original image, subtraction was operated for the image pixel information of the both images, and a subtracted image (FIG. 3B at (d), DNP original image) with the matrix number of 16×16 was acquired.

Subsequently, the 16×16 DNP image pixel information was subjected to two-dimensional linear interpolation by the pixel number conversion (pixel interpolation) to the matrix number of 128×128, and this was made into 128×128 DNP operating image pixel information (FIG. 3B at (e)).

FIG. 3B at (a) is a core image imaged with the matrix number of 128×128 and TR=500 milliseconds. This core image pixel information and the DNP operating image pixel information in FIG. 3B at (e) were subjected to the Hadamard product operation, and the 128×128 DNP created image was built.

(Notation when Pixel was Interpolated)

Regarding notation when the pixel is interpolated, when the pixel of the image pixel information with the matrix number of 32×32 is interpolated into the image pixel information with the matrix number of 128×128, it is noted by using an arrow such as "32×32→128×128" or the like.

(Result of Experiment 5)

In the subtracted image (DNP original image) with the matrix number of 16×16 in FIG. 3B(d), the resolution of the Cmp sealed sample tube was remarkably low, and pixel roughness was conspicuous, which was hard to be analyzed. However, in the 16×16→128×128 DNP created image in FIG. 3B at (f), the shape of the Cmp sealed sample tube was extremely clear, and the image had high luminance. When the DNP created image in FIG. 3A at (e) in the experiment 4 is compared with the created image in FIG. 3B at (f) in the experiment 5, a shape of the Cmp sealed sample tube in FIG. 3B at (f) in the experiment 5 was clear, and its profile was sharper than FIG. 3B at (d) in the experiment 5.

This result was astonishing, and the result of the experiment 5 shows possibility that a marked contribution could be made to analysis of unclear images. The DNP image by the conventional low magnetic field fixed apparatus has low sensitivity (low luminance) and is an imaging system which cannot execute imaging easily unless the matrix number is reduced (an area of one pixel is increased). In the present invention, a clear analysis image (DNP created image) can be built even from an image with a small matrix number as above.

The inventor made objective evaluation of the images in the experiment 4 and the experiment 5 by numerical values. FIG. 3C is a table of the results of numerical analysis of the signal intensity (SI) and the signal-to-noise ratio (SNR) of the experiment 4 and the experiment 5.

The numerical analysis in FIG. 3C was made with the method similar to that of the experiment 1.

When the DNP image imaged with the matrix number of 128×128 by the conventional method in the experiment 4 is compared with the DNP created image ($CI_{created\text{-}DNP}$), the SI was increased by approximately 10,000 times and the SNR by as high as 39 times. This result of the experiment 4 repeats the result of the aforementioned experiment 2, which shows that the present invention is extremely effective for the analysis.

On the other hand, in the result of the pixel number conversion (linear interpolation method) in the experiment 5, as compared with the signal intensity of 764.28 in the DNP image with the conventional art as a counterpart, the signal intensity of the 16×16→128×128 DNP created image acquired by the pixel interpolation has increased by approximately 3000 times and the SNR by 60 times, which supports that the image more suitable for the analysis than the conventional art was built.

What to pay attention is the SNR, and as compared with an increase (Increase) rate of the 128×128 DNP created image in the experiment 4, which was 39 times, the increase (Increase) rate of the experiment 5 was 60 times.

The operating image pixel information in the experiment 4 was imaged with the matrix number of the 128×128 $CI_{op\text{-}DNP}$. On the other hand, the operating image pixel information in the experiment 5 is the image pixel information of the 16×16 $CI_{op\text{-}DNP}$ imaged with the matrix number whose encoding number was reduced to ⅛. Though the imaged operating image pixel information in the experiment 5 has the matrix number smaller than the matrix number of the experiment 4, the SNR was improved.

The results of the experiment 4 and the experiment 5 show that, even if the imaging is performed with the matrix number of the original image reduced to ⅛, the SNR is favorable. The more the matrix number increases, the longer time is taken for imaging with the magnetic resonance imaging apparatus such as MRI. The photographer (analyzer) can reduce time for imaging by reducing the matrix number.

Moreover, it was found that the present invention can build the created images with astonishingly improved SI and SNR as compared with the conventional art and can help analysis by the photographer (analyzer).

Experiment 6 to Experiment 8

The experiment 6 to the experiment 8 were conducted with the purpose of confirming whether the same results as those of the experiments 1 to 3 can be acquired with a chicken wing, which is closer to a living body.

The sealed sample tube (outer diameter and height are both 8 mm) in which 2 mM of a free radical solution is enclosed is embedded below the skin of the chicken wing. In the chicken wing, a surface coil for ESR excitation is attached with the skin between them, and the experiments were conducted by using the FC-DNP-MRI similarly to the experiments 1 to 3.

Figure 4A:
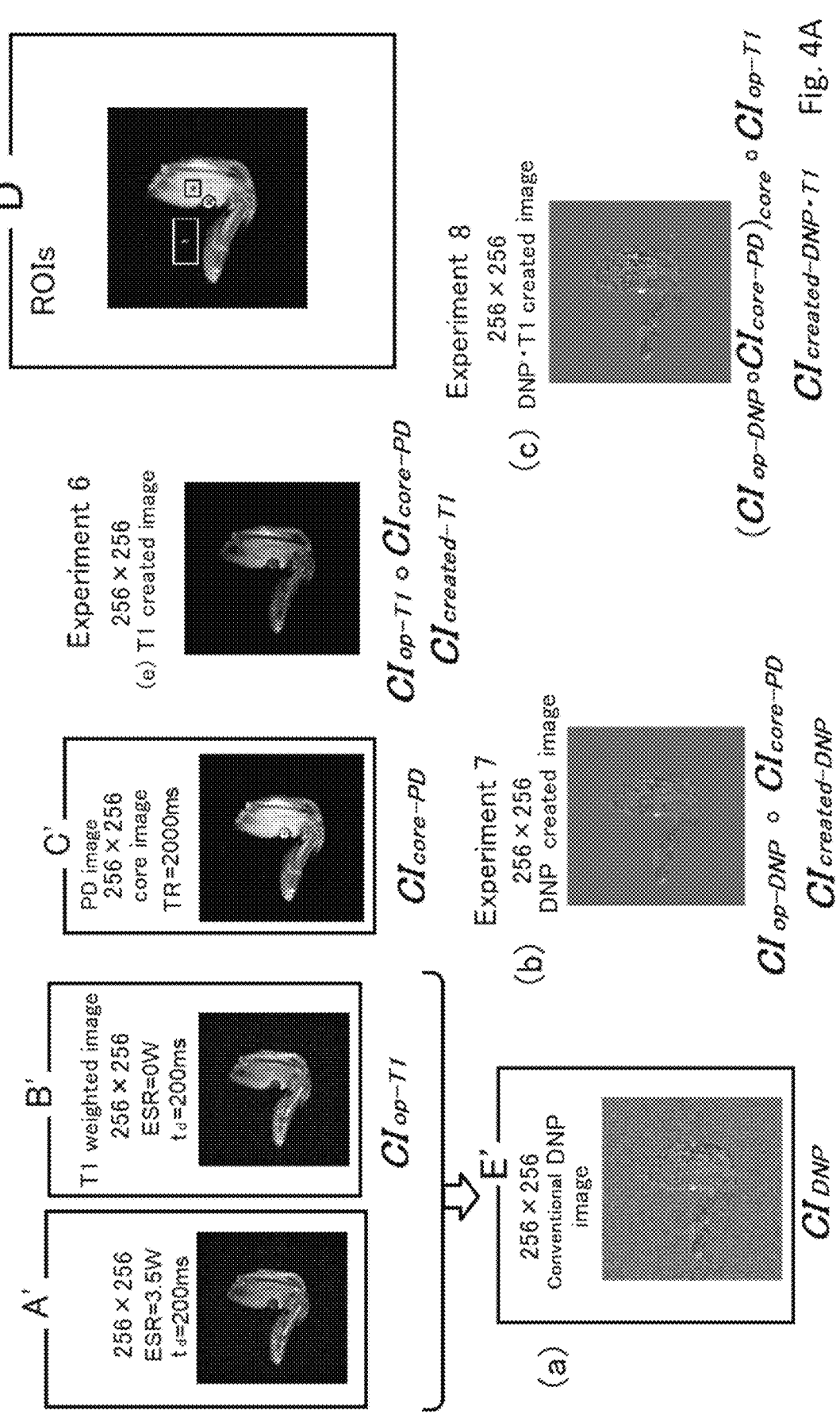
FIG. 4A is an explanatory diagram of a $T_1$ created image, a DNP created image, and a DNP·$T_1$ created image built in an experiment 6 to an experiment 8 by using a living being sample.

FIG. 4A is an explanatory diagram of the experiments 6 to 8 using a living being sample.

An [image A'], an [image B'], and an [image C'] in FIG. 4A are three images imaged in advance for use in the experiment 6 to the experiment 8, and the imaging conditions are the same as those in the experiment 1. The [image A'] is an image under the ESR excitation for the DNP image acquisition. The [image B'] is an image imaged under the same conditions as those for the image A except the ESR non-excitation and is an image called the $T_1$ weighted image. The [image C'] is a PD image. The [image D'] is a diagram showing regions of interest (ROIs) set to parts in the vicinity of 2 mM of the Cmp sealed sample tube (Cmp2Mm) and the ESR coil surface (Surface), a wing part (wing), and a void noise part.

Luminance was measured for each ROI, and numerical analysis was conducted with a method similar to that of the experiment 1. FIG. 4B is a table of numerical analysis of the signal intensity (SI) and the signal-to-noise ratio (SNR). (a) is a table of the result of the experiment 6, and (b) is a table of the results of the experiment 7 and the experiment 8. Left columns in the tables in FIGS. 4B(a) and 4B(b) show data in ROIs of the [image D'] set in the order of the wing, Cmp2mM, and the surface from top.

The [image B'] is an ESR non-excitation image and is used also as the $T_1$ operating image other than for creation of the DNP image.

The subtraction (subtraction) of the image pixel information of the [image A'] and the [image B'] was operated, and the DNP image [image E'] by the conventional method in FIG. 4A(a) was acquired and used as a comparison target. This image was used also as the DNP operating image.

The experiment 6 is an experiment in which, with the $T_1$ weighted image in the [image B'] as the operating image, the Hadamard product operation of $CI_{op\text{-}T1} \circ CI_{core\text{-}PD}$ was performed by using the PD core image of the [image C']. The acquired $T_1$ created image is $CI_{created\text{-}T1}$ in FIG. 4A(e).

The experiment 7 is, as shown in FIG. 4A(b), an experiment in which the Hadamard product operation of $CI_{op\text{-}DNP} \circ CI_{core\text{-}PD}$ was performed, and the acquired DNP created image pixel information is $CI_{created\text{-}DNP}$.

Moreover, in the experiment 8, the Hadamard product operation of $CI_{op\text{-}DNP} \circ |CI_{core\text{-}PD})$ core $\circ CI_{op\text{-}T1}$ was performed with FIG. 4A(b) as the core image, and DNP·$T_1$ created image pixel information $CI_{created\text{-}DNP\cdot T1}$ was acquired.

FIG. 4B(a) is a result of the $T_1$ created image of the experiment 6, and as compared with the $T_1$ weighted image by the conventional method as a comparison example, the SI increased by 2000 times or more, and the SNR by 20 times or more. From this result of the numerical analysis, as compared with the conventional art, it was known that the $T_1$ created image of the present invention is an image which can be analyzed extremely easily for the SI and the SNR.

As the result of the numerical analysis of the DNP created image (experiment 7) and the DNP·$T_1$ created image (experiment 8) in the table of FIG. 4B(b), as compared with the conventional method, in the DNP created image of the present invention, the SI increased by approximately 2000 times and the SNR by 20 times. Moreover, in the DNP·$T_1$ created image of the present invention, an image with astonishingly high resolution/high luminance of the SI by 1,000,000 times and the SNR of 100 times or more higher than the conventional method was acquired.

Experiment 9

The experiment 7, the experiment 9, and the experiment 10 below are a series of experiments conducted with the purpose of examining an influence given by the matrix number of the operating image by using the chicken wing. These experiments have purposes to confirm that the results of the experiment 4 and the experiment 5 which similarly examined the influence of the matrix number of the operating image occur in any image analysis, not in special circumstances of an imaging target or the imaging system.

The experiment 9 and the experiment 10 were conducted with the similar imaging system and imaging conditions by using the similar sample to those in the experiment 6 to the experiment 8.

The experiment 9 is an experiment to examine an effect of the pixel number conversion (pixel interpolation). FIG. 5A is an explanatory diagram of the experiment 9 using a living being sample and explains a process of creating a 32×32→256×256 DNP created image built from the image (32×32) with the encoding smaller than that of the experiment 7.

As a comparison target, the experiment 7 with all the images having the 256×256 matrix number was selected.

As the PD image in the [image C'], the image with the same matrix number of 256×256 as the experiment 7 was used. An [image A''] and an [image B''] are newly imaged images and are images imaged by the same imaging system as that of the [image A'] and the [image B'], respectively, except that the matrix number was 32×32.

The [image A''] and the [image B''] with the matrix number of 32×32 were subjected to the subtraction (subtraction) operation with respect to the image pixel information of the both images similarly to the experiment 7, and the subtracted image (FIG. 5A(d)) with the matrix number of 32×32, called the DNP image, was acquired.

The DNP image, which is a subtracted image, has the matrix number different from that of the PD core image of the [image C']. In order to match the matrix numbers of the both images, for the 32×32 subtracted image (DNP image), an image (FIG. 5A(e)) with the matrix number of 32×32→256×256 was acquired by the pixel number conversion (pixel interpolation) using the linear interpolation method. The inventor performed the Hadamard product operation for the 256×256 PD core image pixel information ([image C'] FIG. 5A(a)) by using this 32×32→256×256 DNP image as the operating image. As a result, the 32×32→256×256 $CI_{created\text{-}DNP}$, which is the DNP created image pixel information (FIG. 5A((f)), was acquired. The created image is shown in FIG. 5B-1(*b*).

The formula for acquiring the created image is as shown in FIG. 5A.

The 256×256 $CI_{created\text{-}DNP}$ in FIG. 5B-1(*a*), which is a comparison target, is the one acquired in the experiment 7.

When the both are compared, the 32×32→256×256 $CI_{created\text{-}DNP}$ in FIG. 5B-1(*b*) was an image with markedly high visibility than the 256×256 $CI_{created\text{-}DNP}$ in FIG. 5B-1(*a*), which is a comparison target.

This result is the same as the results acquired so far (results of the experiment 4 and the experiment 5) and supports that this result is not a result having occurred under a special circumstance.

Similarly to the experiment 4 and the experiment 5, the experiment 7 and the experiment 9 are evaluated on whether the ROI, that is, the part of the sample (2 mM of the Cmp sealed sample tube) is clearly seen or not. Whether the chicken wing is seen well or not has nothing to do with the evaluation of this experiment.

It does not mean that the created image of the experiment 7 without pixel interpolation is inferior to the created image of the experiment 9 with the pixel interpolation performed.

Depending on the imaging system, a created image which can be sufficiently analyzed can be acquired without performing the pixel interpolation in some cases. If the analysis target is influenced by the pixel interpolation or the like, the created image without performing the pixel interpolation is preferably used for analysis.

Experiment 10

The experiment 10 is an experiment with the experiment 8 using the [image A'], the [image B'], and the [image C'] with the matrix number of 256×256 shown in FIG. 4A as a comparison target.

The created image pixel information acquired in the experiment 8 is expressed as 256×256 $CI_{created\text{-}DNP\text{-}T1}$.

By means of the experiment 10, the created image pixel information (FIG. 5B-2 at (c)) expressed as 256×256 $CI_{created\text{-}DNP\text{-}T1}$ was built by using the 256×256 [image A''] as well as the [image B''] and the 256×256 [image C'] shown in FIG. 5A.

The used formula is shown in FIG. 5B-2 at (c).

The $DNP\cdot T_1$ created image acquired in the experiment 10 was an image in which the part of the sample (2 mM of Cmp sealed sample tube) can be discriminated extremely clearly.

Figure 5C:
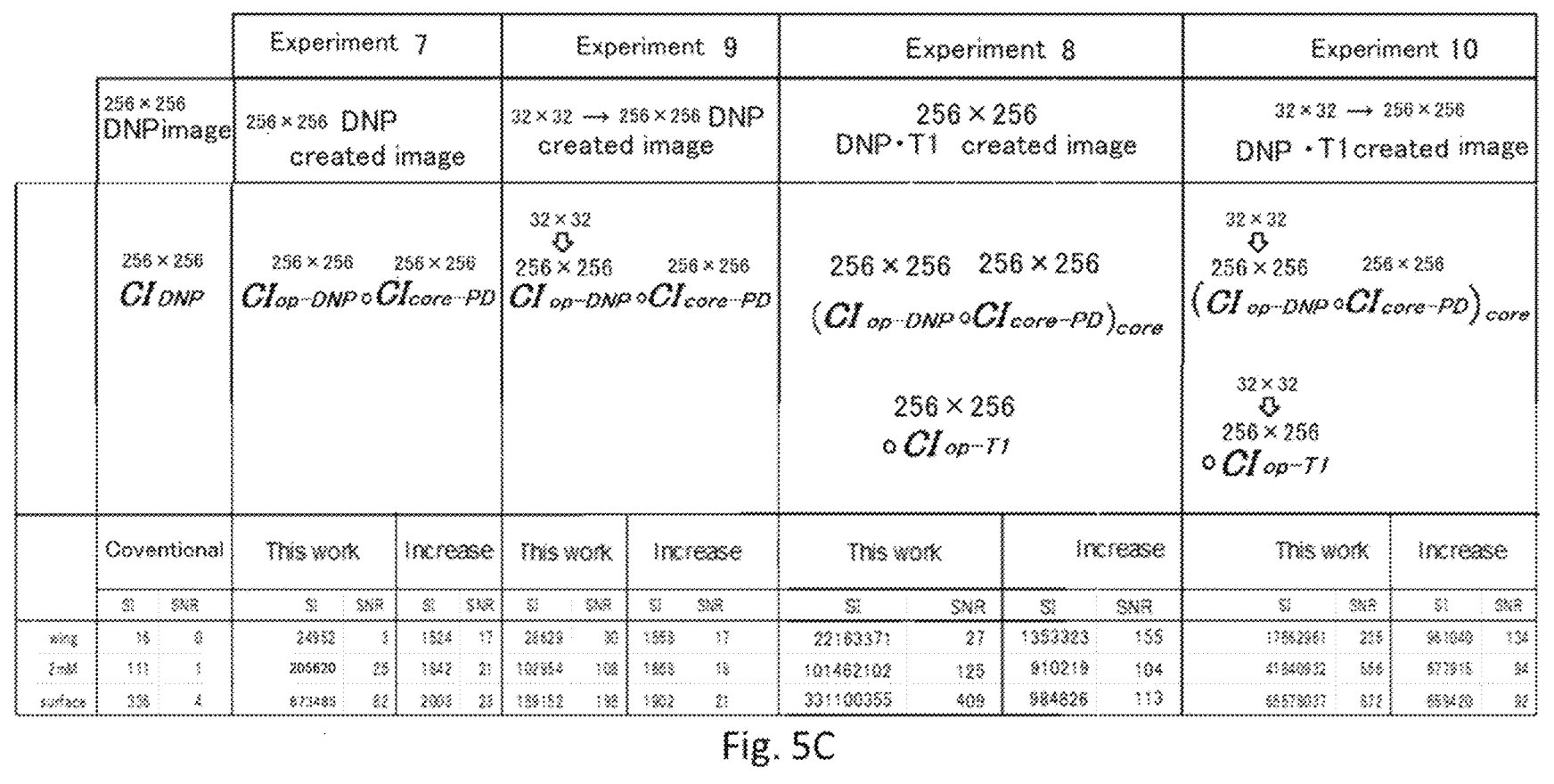

FIG. 5C is a table comparing the signal intensity (SI) and the signal-to-noise ratio (SNR) with the results of the experiment 7 (FIG. 5B-1 at (a)), the experiment 9 (FIG. 5B-1 at (b)), the experiment 8 (FIG. 4A at (c)), and the experiment 10 (FIG. 5B-2 at (c)) in order. For the numerical analysis of the signal intensity (SI) and the signal-to-noise ratio (SNR), the method similar to that of the experiment 6 was used.

The table in FIG. 5C shows that even the created image (DNP created image) using the 32×32 operating image with the encoding number reduced to ⅛ can acquire the signal intensity and the signal-to-noise ratio to the same degree as those of the created image (DNP created image) using the 256×256 operating image.

When the $DNP\cdot T_1$ created image of the present invention shown in the experiment 10 is compared with the DNP image of the conventional method, the signal intensity increased by approximately 700,000 times and the signal-to-noise ratio by approximately 100 times, which supports the effect of the present invention.

(Matrix Number)

It is needless to say that the optimal matrix number of the operating image differs in accordance with the imaging system, the analysis purpose and the like. Depending on the imaging system or the analysis purpose, the optimal matrix number of the operating image is varied such that 16×16 is appropriate or 128×128 is appropriate. It was found that the reduction of the matrix number does not necessarily result in favorable signal intensity (SI) or signal-to-noise ratio (SNR), and there is an optimal matrix number depending on an analysis target (sample).

Therefore, it was found that, when the present invention which reduces the encoding number is to be embodied, an optimal matrix number for a target is preferably acquired in advance by performing preliminary imaging.

(Application of the Present Invention)

In the MRI, an increase of the pixel area by reducing the encoding number has been conventionally performed for imaging of a sample with low signal intensity. There is a method of increasing the number of integrations for higher sensitivity, but MRI imaging time prolongs in accordance with the number of integrations, which is a problem. For example, a super-polarization metabolism image method using a chemical-shift image or a molten DNP imaged with the conventional art is used for examining the metabolism, but the pixel size needed to be increased for the imaging in order to acquire the chemical shift information. When the pixel size is made larger, the pixel number (matrix number) is inevitably made smaller, and space resolution is lowered.

As a method of making an image with a smaller encoding number clearer, algorithms such as a compression sensing method, a patch method, a Bayesian method and the like have been presented, but they have many problems that complicated calculation processes are needed and the like.

The various experiments illustrated in this description show that, even with the operating image with a smaller pixel number, a created image with high luminance and high resolution can be built by separately preparing a core image with high resolution of the imaging system different from that of the operating image and by performing the Hadamard product operation.

Moreover, regarding the operating image, any number of images by different imaging systems can be used in accordance with the purpose.

For example, suppose a case in which distribution of a substance A is to be image-analyzed.

An imaging system α can image images having high detection sensitivity of the substance A and concentration known, but has a defect that substances A' and A'' similar to the substance A are also detected.

An imaging system β does not detect the substances A' or A" similar to the substance A at all but has a defect that the detection sensitivity of the substance A is low.

With the present invention, an extremely favorable created image can be built by using two operating images, that is, an α operating image of the imaging system α and a β operating image of the imaging system β so as to make up for defects of each other.

Moreover, if there is no appropriate core image, the photographer (analyzer) can also create a core image without concentration dependency on a specific substance by operating the Hadamard product for a plurality of images of different imaging systems.

Furthermore, since imaging of one image with the magnetic resonance imaging apparatus such as MRI takes time, it has been considered that video imaging is difficult. For example, video imaging of a heart is in demand in a medical technical field. Thus, methods (conventional methods) such as parallel imaging, sensitivity encoding (SENSE) and the like have been developed. The conventional methods are methods for improving imaging speeds by skipping phase encoding in the imaging. Due to the skipping of the phase encoding, aliasing occurs, but it was a method for solving this by using a plurality of receiving coils (electromagnetic-wave transmitting and receiving part 23).

Here, the inventor illustrates an example of imaging a video without a need to use the plurality of receiving coils (electromagnetic-wave transmitting and receiving part 23) by applying the present invention.

The magnetic resonance imaging apparatus (analysis system) 1 of the embodiment is capable of high-speed imaging of a heart by reducing the encoding number. And the photographer (analyzer) prepares another tomographic imaging system (which does not have to be MRI) and images an image with high resolution and high luminance for each heartbeat phase so as to have this as a core image.

The photographer (analyzer) selects an image which matches the heartbeat phase to be a core image from a large number of images imaged by the magnetic resonance imaging apparatus (analysis system) 1. Then, the photographer (analyzer) images an operating image by the imaging system suitable for detection of a heart disease by using the analysis system 1 of the present invention. Since the operating image can have the matrix number reduced and is capable of high-speed imaging, imaging for each heartbeat phase is possible. Regarding the selected image with a small matrix number, the pixel is interpolated and matched with the matrix number of the core image so that an operating image is acquired. In this case, an analysis target is the entire image of the heart.

The photographer (analyzer) can acquire a created image corresponding to a specific phase of the heart by using the operating image and the core image created as above. By creating such created images for all the phases of the heartbeat, it makes a video.

It is needless to say that the video may be created automatically by the analysis system 1 of the present invention or may be created by the photographer (analyzer).

(Different Imaging System)

Moreover, in acquisition of an image for the nuclear-spin chemical shift, the core image pixel information with high luminance/high resolution may be created on the basis of an image of nuclear magnetization of a targeted specific nuclear spin. For example, the core image pixel information may be acquired by utilizing the nuclear overhauser effect and/or one or a plurality of phenomena including the spin decoupling, the fat-signal suppression method, and the relaxation phenomenon.

Moreover, in the experiment described above, attention was paid to the vertical relaxation phenomenon by using the MRI, but created images with high luminance related to various phenomena can be acquired from the operating images such as a lateral-relaxation operating image, a magnetic-sensitivity operating image, a spin-diffusion operating image, a perfusion operating image and the like.

The analysis system 1 of the present invention can have various images such as the PD weighted image, the $T_1$ weighted image, the $T_2$ weighted image, the diffusion weighted image, the perfusion weighted image, the chemical shift image, the DNP image, the $T_2$*weighted image ($T_2$ star weighted image), the functional brain image (functional brain image), the susceptibility-weighted image (susceptibility-weighted image), the phase image (phase image) and the like, as the operating image or the core image. Moreover, in the present invention, a Dixon method used for the purpose of suppressing a specific tissue signal such as a fat or a purpose of selecting a peak of the chemical shift image or the like can be used at the same time.

The present invention is not limited to hydrogen but can be also applied to analysis of various nuclear spin images such as $^{13}C$.

Regarding the core image and the operating image, it may be so configured that one color image is used as the core image, the color image is subjected to spectral resolution so as to acquire an image having only a specific spectral component, and this image is used as the operating image. The "different imaging system" referred to in the present invention is a concept also including extraction of a predetermined component from one image.

(Reducing Means of Matrix Number of Image)

The inventor has illustrated the embodiment in which the image with the matrix number reduced in the imaging stage is acquired, and this is used as the operating image.

The inventor repeated the experiment in which, instead of the DNP image imaged with 16×16, the matrix number (pixel number) of the acquired image with 128×128 or 256×256 is reduced to 16×16 by the software, and the image is made as the one in the experiment 5 again. Moreover, the experiment similar to the experiment 5 was repeated also for the image imaged by the imaging system other than MRI.

Though the simulation experiment data is not shown, the result similar to that of the experiment 5 could be acquired as the result of the experiment.

The result of the simulation experiment shows that the present invention can be universally completed for images of any imaging means (X-ray, ultrasonic, PET and the like). Moreover, it was found out that the present invention is also completed even if the core image and the operating image are images in different modalities such as X-ray and the MRI.

(Imaging Part)

The analysis system 1 of the present invention may include the imaging part 2. When the analysis system 1 includes the imaging part 2, a large number of images with different imaging conditions (size of the matrix number or the like) can be imaged and thus, an operating image or a core image optimal for the created image can be selected.

(Automation)

The analysis system 1 of the present invention can have the control part 3 which automates selection of the operating image or the core image to be an optimal created image.

Moreover, the analysis system 1 of the present invention can automate control of imaging by the imaging part 2.

The analysis system 1 of the present invention can automate various processes other than the above.

(Reduction of Pixel Number by Pixel Number Conversion)

As described above, it is found out that, in the operating image pixel information, the effect of the present invention is increased when its matrix number is smaller than that of the core image pixel information. Thus, such experiment was conducted that the matrix number of the operating image pixel information imaged with the same matrix number as that of the core image pixel information is reduced once by the pixel number conversion. The operating image pixel information with the matrix number reduced has the pixel number interpolated so that the matrix number becomes the same as the matrix number of the core image pixel information again. Astonishingly, the analysis target region of the created image pixel information created by using such processes became clearer than the created image pixel information using the image imaged with the same matrix number and was easy to be analyzed. The present invention also encompasses the usage as above.

(Three-Dimensional Image)

A general three-dimensional image is created by lamination of two-dimensional images or three-dimensional Fourier transformation. The present invention is applied not only to a two-dimensional image as in the embodiment but can be expanded to a three-dimensional image. Moreover, the present invention includes application to a three-dimensional image pixel information with a voxel instead of a pixel by the three-dimensional Hadamard product.

(Application of the Present Invention to Some Images)

When the Hadamard product is operated, such a mode has been explained in the embodiment or experiment described above that the matrix numbers of the core image and the operating image are made the same. It is only necessary that the core image and the operating image both have the same analysis target region. For example, suppose that the imaging region of the core image is wide, and the analysis target region is imaged only on a part of the whole. On the other hand, suppose that, in the operating image, imaging narrowed to the analysis target region was performed, and only the analysis target region is imaged.

In such a case, the present invention is applied only to the part of the analysis target region of the core image. An image is virtually cut out of the core image and the operating image so as to include the analysis target region, the pixel number conversion is executed so that the matrix numbers of the both images match each other, and after they are positioned, operations including the Hadamard product are performed.

The image created at this time becomes such an image in which a part other than the analysis target region of the core image remains to have the core image pixel information, and only the analysis target region is replaced with the created image pixel information.

(Utilization of Imaged Images)

The present invention can be applied also to the imaged image pixel information imaged in the past. For example, by utilizing the (past) image pixel information before being diagnosed to be cancer, how the cancer tissues before being diagnosed to be cancer have become larger to the current time can be tracked by going backward in time. Utilization of DICOM data is a preferred aspect of the present invention. As described above, the analysis system 1 of the present invention may use the required operating image pixel information and core image pixel image downloaded from on the network, without having the imaging part 2.

(Analysis System)

As described above, the analysis system 1 of the present invention may or does not have to include the imaging part 2. Moreover, the analysis system 1 of the present invention may be present on the network or may be disposed in a dispersed manner as program modules. When the analysis system 1 of the present invention includes the imaging part 2, the analysis system 1 may be integrated with the imaging part 2 such as the MRI, or the analysis system 1 may be connected to the imaging part 2 by a connector. Furthermore, the analysis system 1 of the present invention also includes a case in which it is only an analysis system of images, not having the imaging part 2. In this case, the analysis system 1 has an image taking-in device provided, and a created image is built from the taken-in image.

The various experiments explained so far show that those which could not be analyzed easily (or at all) due to too poor the signal intensity (SI) and the signal-to-noise ratio (SNR) can be analyzed, and technical contribution of the present invention is great even only in this point.

Moreover, for the photographers (analyzers) such as image-reading doctors, who are required to analyze a large number of images, image-reading time can be shortened by using the created image of the present invention, which can be read easily. Moreover, since the created images are clear, contribution can be made to reduction of misreading by the image-reading doctors.

The applicant has described the embodiments and the experiments related to this art in detail by referring to the drawings, but specific configuration is not limited to these embodiments. The present invention includes changes or the like in design within a range not departing from the gist of the present invention.

Moreover, each of the embodiments and experiments described above can be combined as long as there is no particular contradiction or problem in its purpose, configuration and the like.

REFERENCE SIGNS LIST

1 Magnetic resonance imaging apparatus (analysis system)
2 Imaging part
21 Magnetic field generating part
211 Static magnetic field generating part
212 Gradient magnetic field generating part
23 Electromagnetic wave transmitting and receiving part
24 Bed
3 Control part
31 Imaging control part
312 Imaging system selection part
32 Image component part
321 Image conversion part
322 Image operation part
323 Memory part
4 Database
41 Core image imaging condition database
42 Operating image imaging condition database
5 Display

What is claimed is:

1. An analysis system, comprising:

an image component part, wherein the image component part includes a memory part and an image operation part;

the memory part stores at least core image pixel information and operating image pixel information;

the core image pixel information and the operating image pixel information include the same sample containing analysis target and the same analysis target region and include a predetermined number of pixels imaged by different imaging systems;

the operating image pixel information includes analysis information associated with a property parameter to be quantitatively detected in the same analysis target region;

the operating image pixel information is generated by reducing a number of pixels to one fourth or less with compared to the core image pixel information thereby increasing a signal-to-noise ratio;

the core image pixel information does not include the analysis information, or does include the analysis information but is not associated with the property parameter to be quantitatively detected, such that the core image pixel information contains a profile of the analysis target with higher sharpness than the profile of the analysis target contained in the operating image pixel information;

the image operation part:

executes positioning of the same analysis target region between the core image pixel information and the operating image pixel information, matches pixel numbers in the same analysis target region between the core image pixel information and the operating image pixel information; and builds new created image pixel information by performing operations including Hadamard product, thereby fusing at least one or more pieces of the core image pixel information and at least one or more pieces of the operating image pixel information to increase contrast, which is defined as difference in the property parameter between the analysis target region and surrounding regions in the new created image pixel information.

2. The analysis system according to claim 1, further comprising:

an imaging part.

3. A non-transitory computer-readable recording medium which stores a program to operate the analysis system according to claim 1.

4. The analysis system according to claim 1, wherein the property comprises concentration of Cmp (3-carbamoyl-PROXYL), dynamic nuclear polarization (DNP), relaxation speed, diffusion, perfusion, magnetic susceptibility, or chemical shift.

5. The analysis system according to claim 1, wherein the operating image pixel information is generated by reducing the number of pixels to one sixty-fourth or less with compared to the core image pixel information thereby increasing the signal-to-noise ratio.

6. A production method of an analysis image for building a new created image, comprising:

preparing core image pixel information and operating image pixel information;

preparing:

the operating image pixel information including analysis information associated with a property parameter to be quantitatively detected in an analysis target region, wherein the operating image pixel information is generated by reducing a number of pixels to one fourth or less with compared to the core image pixel information thereby increasing a signal-to-noise ratio;

the core image pixel information not including the analysis information, or including the analysis information that is not associated with the property parameter to be quantitatively detected in the same analysis target region as the one in the core image pixel information, and the operating image pixel information and the core image pixel information being image pixel information including the same sample containing the same analysis target in the target region and the same analysis target region, respectively, and including a predetermined number of pixels imaged by imaging systems different from each other;

executing positioning of the same analysis target region between the core image pixel information and the operating image pixel information, and matches pixel numbers in the same analysis target region between the core image pixel information and the operating image pixel information;

and building new created image pixel information by performing operations including Hadamard product, thereby fusing at least one or more pieces of the core image pixel information and at least one or more pieces of the operating image pixel information to increase contrast, which is defined as difference in the property parameter between the analysis target region and surrounding regions in the new created image pixel information.

7. The production method according to claim 6, wherein the property comprises concentration of Cmp (3-carbamoyl-PROXYL), dynamic nuclear polarization (DNP), relaxation speed, diffusion, perfusion, magnetic susceptibility, or chemical shift.

8. The production method according to claim 6, wherein the operating image pixel information is generated by reducing the number of pixels to one sixty-fourth or less with compared to the core image pixel information thereby increasing the signal-to-noise ratio.

* * * * *